United States Patent
Manolakos et al.

(10) Patent No.: US 11,223,461 B2
(45) Date of Patent: Jan. 11, 2022

(54) ASSOCIATION OF TRANSMISSION CONFIGURATION INDICATOR STATES TO PHYSICAL CELL IDENTITIES

(71) Applicant: QUALCOMM Incorporated, San Diego, CA (US)

(72) Inventors: Alexandros Manolakos, San Diego, CA (US); Xiaoxia Zhang, San Diego, CA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 32 days.

(21) Appl. No.: 16/583,704

(22) Filed: Sep. 26, 2019

(65) Prior Publication Data
US 2020/0351055 A1    Nov. 5, 2020

(30) Foreign Application Priority Data
Sep. 28, 2018  (GR) .............................. 20180100442

(51) Int. Cl.
*H04L 5/00* (2006.01)
*H04W 56/00* (2009.01)
(Continued)

(52) U.S. Cl.
CPC ........ *H04L 5/0053* (2013.01); *H04J 11/0079* (2013.01); *H04L 5/0051* (2013.01);
(Continued)

(58) Field of Classification Search
CPC .. H04L 5/0053; H04L 5/0051; H04W 56/001; H04W 72/042; H04J 11/0079; H04J 2011/0096
See application file for complete search history.

(56) References Cited

U.S. PATENT DOCUMENTS

| | | | |
|---|---|---|---|
| 2018/0091212 A1* | 3/2018 | Lee | H04B 7/086 |
| 2018/0198575 A1* | 7/2018 | Sheng | H04J 11/0069 |

OTHER PUBLICATIONS

Remaining Issues on the NR Mobility, 3GPP Draft; R1-1717583 Mobility V3, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 13, 2017 Oct. 8, 2017 (Year: 2017).*

(Continued)

*Primary Examiner* — Brenda H Pham
(74) *Attorney, Agent, or Firm* — Holland & Hart LLP

(57) ABSTRACT

A base station may identify an association between a set of physical cell identifiers (PCIs) identifying different transmission reception points (TRPs) and a set of transmission configuration indicator (TCI) states for a user equipment (UE). The base station may transmit a TCI state and PCI association indication to the UE. The UE may receive a downlink transmission using a receive beam associated with a TCI state, and may identify a PCI of the set of PCIs to use to decode the received downlink transmission. In cases where the TCI state used to receive the downlink transmission is associated with multiple PCIs, the UE may select a default PCI from the multiple PCIs, and may decode the received transmission accordingly. In some examples, the UE may receive reference signals from one or more of the serving TRPs and may identify a PCI to use to decode the received reference signals.

30 Claims, 18 Drawing Sheets

(51) Int. Cl.
*H04W 72/04* (2009.01)
*H04J 11/00* (2006.01)

(52) U.S. Cl.
CPC ....... *H04W 56/001* (2013.01); *H04W 72/042* (2013.01); *H04J 2011/0096* (2013.01)

(56) References Cited

OTHER PUBLICATIONS

3rd Generation Partnership Project; Technical Specification Group Radio Access Network; NR, Physical layer procedures for data (Release 15), 3GPP Standard; Technical Specification; 3GPP TS 38.214, 3rd Generation Partnership Project (3GPP), (Year: 2018).*
"3rd Generation Partnership Project; Technical Specification Group Radio Access Network; NR; Physical layer procedures for Data (Release 15)", 3GPP Standard, Technical Specification, 3GPP TS 38.214, 3rd Generation Partnership Project (3GPP), Mobile Competence Centre, 650, Route Des Lucioles, F-06921 Sophia-Antipolis Cedex, France, vol. RAN WG1, No. V15.2.0, Jun. 29, 2018, XP051474491, pp. 1-95, [retrieved on Jun. 29, 2018], section 1 "Scope", section 5 .1.2 .1 "Resource allocation in time domain" section 5 .1.2 .2 "Resource allocation in frequency domain" section 5.1.5 "Antenna ports quasi co-location", section 6.1.4, section 6.1.4.1, tables 6.1.4.1-1, 6.1.4.1-2.
Ericsson: "Lower-Layer Mobility Enhancements", 3GPP Draft; R1-1902528 Lower-Layer Mobility Enhancements, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019 Feb. 15, 2019, XP051600224, Retrieved from the Internet: URL:http://www.3gpp.org/ftp/tsg%5Fran/WG1%5FRL1/TSGR1%5F96/Docs/R1%2D1902528%2Ezip [retrieved on Feb. 15, 2019], 8 pages.
Huawei et al., "Views on Beam-based Mobility in NR", 3GPP Draft; R1-1907543, 3rd Generation Partnership Project (3GPP), Mobile Competence Centre; 650, Route Des Lucioles; F-06921 Sophia-Antipolis Cedex; France, vol. RAN WG1, No. Reno. USA; May 13, 2019-May 17, 2019 May 13, 2019, XP051728976, Retrieved from the Internet: URL:https://www.3gpp.org/ftp/tsg_ran/WG1_RL1/TSGR1_97/Docs/ [retrieved on May 13, 2019], 2.2 QCL Signaling Enhancements for Beam Management, 4 pages.
International Search Report and Written Opinion—PCT/US2019/053613—ISA/EPO—dated Jan. 14, 2020.
Samsung: "Remaining Issues on the NR Mobility", 3GPP TSG RAN WG1 #90b, 3GPP Draft; R1-1717583 Mobility V3, 3rd Generation Partnership Project (3GPP), Mobile Competence Centre; 650, Route Des Lucioles; F-06921 Sophia-Antipolis Cedex; France, vol. RAN WG1, No. Prague. Czech Republic; Oct. 9, 2017-Oct. 13, 2017, Oct. 2, 2017 (Oct. 2, 2017), 15 Pages, XP051352230, Retrieved from the Internet: URL: http://www.3gpp.org/ftp/tsg_ran/WG1_RL1/TSGR1_90b/Docs/ [retrieved on Oct. 2, 2017] paragraph [0003].

* cited by examiner

ASSOCIATION OF TRANSMISSION CONFIGURATION INDICATOR STATES TO PHYSICAL CELL IDENTITIES

CROSS REFERENCE

The present Application for Patent claims the benefit of Greece Provisional Patent Application No. 20180100442 by MANOLAKOS et al., entitled "ASSOCIATION OF TRANSMISSION CONFIGURATION INDICATOR STATES TO PHYSICAL CELL IDENTITIES," filed Sep. 28, 2018, assigned to the assignee hereof, and expressly incorporated by reference herein.

BACKGROUND

The present disclosure relates to wireless communications, and more specifically to association of transmission configuration indicator (TCI) states to physical cell identifiers (PCIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, wireless communications systems may employ multiple transmission/reception points (TRPs) to serve a UE (e.g., to improve link reliability, increase throughput, etc.). With multi-TRP transmission, a UE may receive downlink communications (e.g., physical downlink shared channel (PDSCH) transmission) from joint transmissions by multiple TRPs. In some cases, quasi-collocation (QCL) relationships may exist between antenna ports used for downlink communications with the UE. Such a relationship may be referred to as a TCI state. Different TCI states may thus correspond to different QCL relationships for downlink communications with a UE, and may be used by a UE to perform receiver processing (e.g., based on the corresponding QCL relationship) for demodulating the received communications. In some cases, a UE may further use a physical cell identifier (PCI) for demodulating received communications (e.g., where each TRP may associated with a different PCI). Current techniques for performing receiver processing based on QCL relationships and a PCI, in certain instances, may be deficient.

SUMMARY

The described techniques relate to improved methods, systems, devices, and apparatuses that support association of transmission configuration indicator (TCI) states to physical cell identifiers (PCIs). Generally, the described techniques provide for a wireless device (e.g., a user equipment (UE)) identifying PCIs associated with multiple transmission/reception points (TRPs) serving the UE (e.g., via TCI state and PCI association information). UE knowledge of PCIs associated with serving TRPs in a multi-TRP environment may provide for decoding of transmissions from TRPs that are scrambled with PCI (e.g., such as common search space (CSS) transmissions or broadcast transmission), improved radio link management (RLM)/radio link failure (RLF) procedures (e.g., as the UE may receive RLM reference signals from TRPs other than an anchor TRP), etc.

A base station may configure a UE with a set of possible TCI states (e.g., via media access control (MAC) control element (MAC-CE) signaling, downlink control information, etc.) used to receive transmissions. The base station may further provide the UE with an association between a set of PCIs (e.g., associated with multiple TRPs, for example of the base station) and the set of TCI states. For example, the base station may transmit an indication of the association to the UE (e.g., the base station may transmit TCI state and PCI association information to the UE), and may subsequently indicate various TCI states to use for different downlink communications with the UE (e.g., based on which TRP(s) the base station may utilize to transmit different downlink transmissions). The UE may then identify a TCI state to use for reception of some downlink transmission (e.g., based on a TCI state indication received from the base station), and may identify one or more PCIs associated with the TCI state based on the received TCI state and PCI association information. In cases where multiple PCIs are associated with a TCI state used for reception, a default PCI may be selected from the multiple PCIs. As such, the UE may decode received downlink transmissions using the identified PCI (e.g., as the downlink transmission may have been scrambled by the serving TRP using its PCI). In some cases, the UE may identify that a TRP has RLM resources configured for the UE and may receive a downlink transmission using a PCI of the TRP that has RLM resources configured (e.g., which may provide for RLM procedures with TRPs other than an anchor TRP, for example, in cases where an anchor TRP fails).

In some examples, a UE may identify an association between a set of reference signals for RLM and a set of PCIs identifying TRPs serving the UE. As such, the UE may receive reference signals from one or more of the serving TRPs and may identify a PCI to use to decode the received reference signals (e.g., based on the association between the set of reference signals for RLM and the set of PCIs, the TCI state used to receive the reference signal and the TCI state and PCI association information, etc.). As such, a UE may identify a service state (e.g., an in-synchronization (IS) state or out-of-synchronization (OOS) state) for each TRP of a set of TRPs serving the UE. In some cases, the UE may determine a signal strength of a first received reference signal is greater than a signal strength of the received second reference signal. In such cases, the PCI identified to be used to decode the downlink transmission may be based on the signal strength, for example such that the PCI associated with the stronger reference signal may be used to decode downlink transmissions (e.g., a control channel) in a common search space. Further, such service state determinations for different TRPs may be used to switch an anchor TRP of the UE to another TRP serving the UE.

A method of wireless communication as a UE is described. The method may include receiving, using one or more receive beams associated with a TCI state, a downlink transmission from a set of TRPs identified by a set of PCIs, identifying, based on the TCI state and an association between the set of PCIs and a set of TCI states, a first PCI of the set of PCIs to use to decode the received downlink transmission, and decoding the received downlink transmission using the identified first PCI.

An apparatus for wireless communication as a UE is described. The apparatus may include a processor, memory coupled with the processor, and instructions stored in the memory. The instructions may be operable, when executed by the processor, to cause the apparatus to receive, using one or more receive beams associated with a TCI state, a downlink transmission from a set of TRPs identified by a set of PCIs, identify, based on the TCI state and an association between the set of PCIs and a set of TCI states, a first PCI of the set of PCIs to use to decode the received downlink transmission, and decode the received downlink transmission using the identified first PCI.

Another apparatus for wireless communication as a UE is described. The apparatus may include means for receiving, using one or more receive beams associated with a TCI state, a downlink transmission from a set of TRPs identified by a set of PCIs, identifying, based on the TCI state and an association between the set of PCIs and a set of TCI states, a first PCI of the set of PCIs to use to decode the received downlink transmission, and decoding the received downlink transmission using the identified first PCI.

A non-transitory computer-readable medium storing code for wireless communication as a UE is described. The code may include instructions executable by a processor to receive, using one or more receive beams associated with a TCI state, a downlink transmission from a set of TRPs identified by a set of PCIs, identify, based on the TCI state and an association between the set of PCIs and a set of TCI states, a first PCI of the set of PCIs to use to decode the received downlink transmission, and decode the received downlink transmission using the identified first PCI.

Some examples of the method, apparatuses, and non-transitory computer-readable medium described herein may further include operations, features, means, or instructions for receiving an indication of the association between the set of PCIs and the TCI state.

In some examples of the method, apparatuses, and non-transitory computer-readable medium described herein, the TCI state may be associated with at least the first PCI and a second PCI of the set of PCIs.

Some examples of the method, apparatuses, and non-transitory computer-readable medium described herein may further include operations, features, means, or instructions for receiving a synchronization signal block (SSB) during an initial access procedure of the UE, and determining a PCI based at least in part on the received SSB, where the first PCI of the plurality of PCIs to use to decode the received downlink transmission includes the determined PCI.

Some examples of the method, apparatuses, and non-transitory computer-readable medium described herein may further include operations, features, means, or instructions for identifying that one of the first TRP or the second TRP may have radio link management (RLM) resources configured for the UE, where the received downlink transmission may be decoded using the first PCI identifying the first TRP or the first PCI identifying the second TRP according to the one of the first TRP or the second TRP having the RLM resources configured.

Some examples of the method, apparatuses, and non-transitory computer-readable medium described herein may further include operations, features, means, or instructions for identifying a configuration of the UE to receive broadcast transmissions from one of the first TRP or the second TRP, where the received downlink transmission may be decoded using the first PCI identifying the first TRP or the first PCI identifying the second TRP according to the identified configuration.

Some examples of the method, apparatuses, and non-transitory computer-readable medium described herein may further include operations, features, means, or instructions for determining that the first PCI may have a smaller value than the second PCI, where the first PCI may be identified based on the determination.

Some examples of the method, apparatuses, and non-transitory computer-readable medium described herein may further include operations, features, means, or instructions for receiving, using one or more receive beams associated with a second TCI state, a second downlink transmission for the first TRP and the second TRP, identifying that the second TCI state lacks an associated PCI and decoding the received second downlink transmission using a default PCI.

Some examples of the method, apparatuses, and non-transitory computer-readable medium described herein may further include operations, features, means, or instructions for monitoring for the downlink transmission in a common search space.

In some examples of the method, apparatuses, and non-transitory computer-readable medium described herein, the downlink transmission includes a downlink control channel signal in the common search space or downlink data channel signal in the common search space.

A method of wireless communication at a base station is described. The method may include identifying an association between a set of PCIs and a set of TCI states for a UE, the set of PCIs identifying a set of TRPs, transmitting, to the UE, an indication of the identified association, and transmitting, to the UE based at least in part on transmitting the indication of the identified association, a downlink transmission encoded according to a first PCI or a second PCI based at least in part on the identified association.

An apparatus for wireless communication at a base station is described. The apparatus may include a processor, memory coupled with the processor, and instructions stored in the memory. The instructions may be operable, when executed by the processor, to cause the apparatus to identify an association between a set of PCIs and a set of TCI states for a UE, the set of PCIs identifying a set of TRPs, transmit, to the UE, an indication of the identified association, and transmit, to the UE based at least in part on transmitting the indication of the identified association, a downlink transmission encoded according to a first PCI or a second PCI based at least in part on the identified association.

Another apparatus for wireless communication at a base station is described. The apparatus may include means for identifying an association between a set of PCIs and a set of TCI states for a UE, the set of PCIs identifying a set of TRPs, transmitting, to the UE, an indication of the identified association, and transmitting, to the UE based at least in part on transmitting the indication of the identified association, a downlink transmission encoded according to a first PCI or a second PCI based at least in part on the identified association.

A non-transitory computer-readable medium storing code for wireless communication at a base station is described. The code may include instructions executable by a processor to identify an association between a set of PCIs and a set of TCI states for a UE, the set of PCIs identifying a set of TRPs, transmit, to the UE, an indication of the identified association, and transmit, to the UE based at least in part on transmitting the indication of the identified association, a downlink transmission encoded according to a first PCI or a second PCI based at least in part on the identified association.

Some examples of the method, apparatuses, and non-transitory computer-readable medium described herein may further include operations, features, means, or instructions for transmitting, to the UE based on transmitting the indication of the identified association, a downlink transmission encoded according to a first PCI or a second PCI based on the identified association.

Some examples of the method, apparatuses, and non-transitory computer-readable medium described herein may further include operations, features, means, or instructions for identifying a first PCI of the plurality of PCIs used to encode a synchronization signal block (SSB) for the UE during initial access for the UE, where the downlink transmission is encoded using the first PCI based at least in part on the identification.

Some examples of the method, apparatuses, and non-transitory computer-readable medium described herein may further include operations, features, means, or instructions for identifying that one of a first TRP of the set of TRPs or a second TRP of the set of TRPs may have radio link management (RLM) resources configured for the UE, where the downlink transmission may be encoded using the first PCI identifying the first TRP or the second PCI identifying the second TRP according to the one of the first TRP or the second TRP having the RLM resources configured.

Some examples of the method, apparatuses, and non-transitory computer-readable medium described herein may further include operations, features, means, or instructions for identifying a configuration of the UE to receive broadcast transmissions from one of a first TRP of the set of TRPs or a second TRP of the set of TRPs, where the downlink transmission may be encoded using the first PCI identifying the first TRP or the first PCI identifying the second TRP according to the identified configuration.

Some examples of the method, apparatuses, and non-transitory computer-readable medium described herein may further include operations, features, means, or instructions for determining that the first PCI or the second PCI may have a smaller value than an other of the first PCI or the second PCI, where the downlink transmission may be encoded using the first PCI or the second PCI having the smaller value.

DETAILED DESCRIPTION

Figure 1:
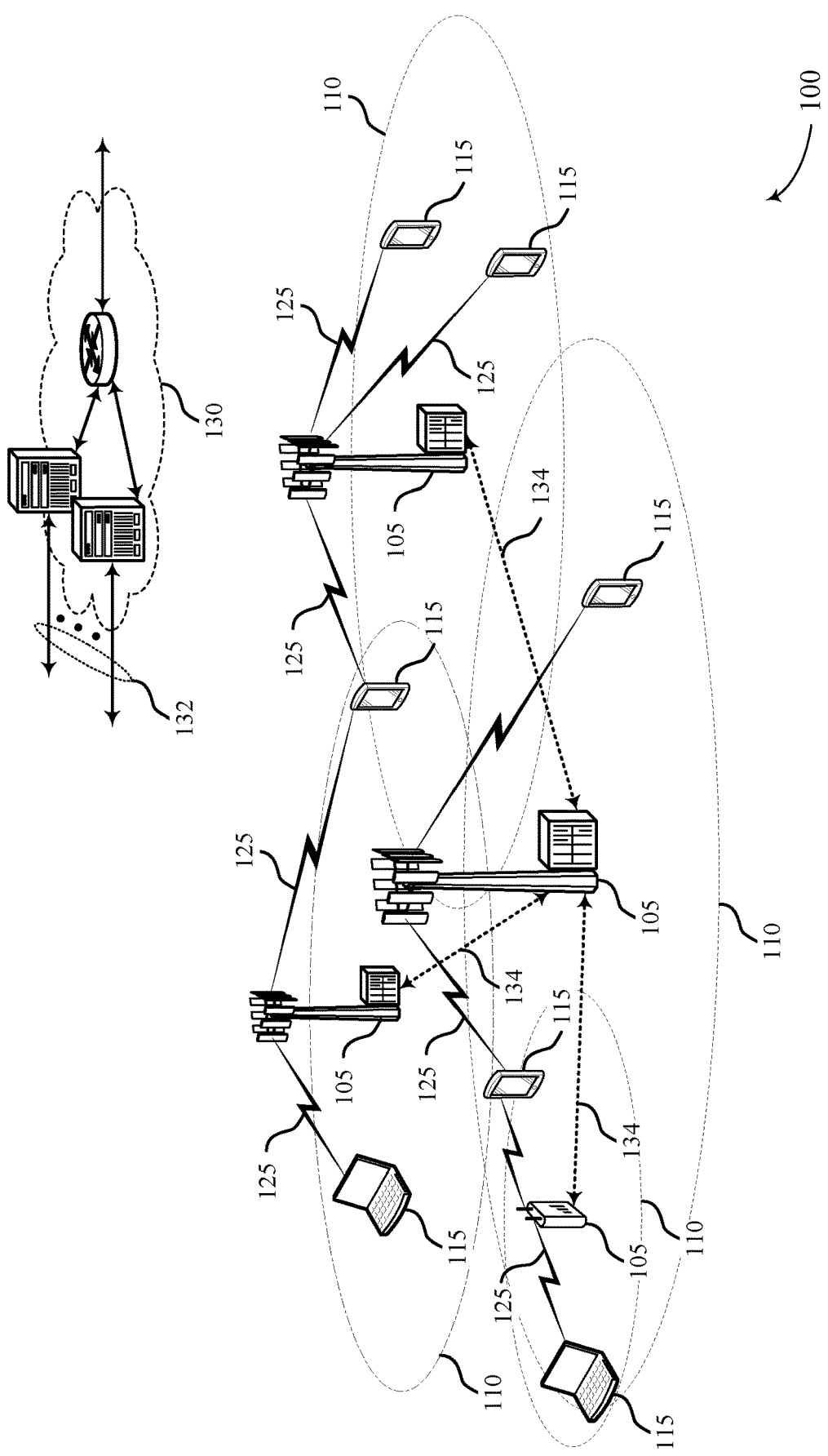
FIG. 1 illustrates an example of a system for wireless communications that supports association of transmission configuration indicator (TCI) states to physical cell identifiers (PCIs) in accordance with aspects of the present disclosure.

Some wireless communications systems may employ multiple transmission/reception points (TRPs) to serve a user equipment (UE) (e.g., to improve link reliability, increase throughput, etc.). With multi-TRP transmission, a UE may receive downlink communications (e.g., physical downlink shared channel (PDSCH) transmission, physical downlink control channel (PDCCH) transmission, etc.) through multiple TRPs. A receiving device (e.g., a UE) may be able to perform receiver processing for demodulating data or control information received on a first set of antenna ports based on reference signals received on a second set of antenna ports that are quasi co-located with the first set of antenna ports. Thus, a quasi co-location (QCL) relationship between antenna ports (also referred to as a QCL assumption when the QCL relationship is assumed) may improve the chances that a UE may be able to successfully decode a downlink transmission from one or more TRPs used for communications to the UE. In some cases, it may be appropriate for a base station to transmit, to a UE, an indication of which antenna ports are quasi co-located such that the UE may be able to identify additional reference signals to use for receiver processing.

In some aspects, a base station may configure a set of transmission configuration indication (TCI) states to use to indicate, to a UE, QCL relationships between antenna ports (e.g., associated with the one or more TRPs) used for transmitting downlink signals to the UE. Each TCI state may be associated with a set of reference signals (e.g., synchronization signal blocks (SSBs), different types of channel state information reference signals (CSI-RSs), or tracking reference signals (TRSs)), and the TCI state may indicate a QCL relationship between antenna ports used to transmit these reference signals and antenna ports used to transmit data or control information to a UE. As such, when a UE uses a particular TCI state for reception of downlink transmissions, the UE may identify that antenna ports used to transmit the reference signals associated with the TCI state are quasi co-located with antenna ports used to transmit data and control information to the UE. Thus, the UE may use the reference signals associated with the TCI state to perform receiver processing for demodulating data or control information received from the one or more TRPs.

Further, some transmissions may be scrambled using a physical cell identifier (PCI) (e.g., of the transmitting TRP). For example, common search space (CSS) transmissions (e.g., PDSCH transmissions scheduled using DCI format 1_0 in CSS, broadcast messages carried in PDSCH, some PDCCH in CSS, etc.) may be scrambled using PCI of the transmitting TRP. However, in some cases, the UE may only be aware of a PCI of a first TRP (e.g., the PCI associated with the anchor TRP or the TRP the UE connected to after initial access, for example based on the PCI determined from an SSB received by the UE during initial access), and may otherwise be unaware of PCIs associated with other TRPs serving the UE. In such cases, the UE may only use the PCI of the first TRP (e.g., and thus only efficiently decode transmissions in CSS encoded using the PCI of the first TRP, from the first TRP).

For example, a TCI state may be associated with one or more TRPs serving the UE (e.g., thus the TCI state may be associated with one or more PCIs). The UE may use (e.g., or assume) a TCI state for receiving communications, and may be unaware of whether the UE is being served by a first TRP, a second TRP, or both (e.g., the UE may just use the TCI state to perform receiver processing for demodulating data or control information regardless of the specific TRPs transmitting to the UE). In scenarios where transmissions may be scrambled using a PCI, the UE may, in some cases, inefficiently receive transmissions scrambled using an unknown PCI (e.g., as the TCI state may be associated with both a first TRP and a second TRP, and the second TRP may be transmitting in CSS using the PCI of the second TRP, which may be unknown to the UE). That is, while a UE may be aware of the PCI of a master or anchor TRP (e.g., a TRP discovered during initial access procedures), the UE may not be aware of PCIs of other TRPs serving the UE. The PCI may be obtained from the SSB received from the master or anchor TRP during the initial access procedure. As such, in scenarios where transmissions are scrambled using PCI, the UE may be aware of a TCI state for reception, but may be unable to efficiently perform receiver processing (e.g., process the physical channel, or decode the received transmission from the multiple TRPs) in cases where the TCI state associated with the communication is associated with more than one PCI (e.g., and the transmission is scrambled using a PCI of a TRP other than the anchor TRP).

The described techniques may provide for TCI state and PCI(s) association. For example, a UE may identify an association between configured TCI states and one or more PCIs (e.g., each associated with one of the one or more TRPs serving the UE). As such, when a UE uses a TCI state to receive downlink transmissions (e.g., PDCCH, PDSCH, etc.), the UE may identify one or more PCIs associated with the TCI state, and may further identify one of the associated PCIs to use for receiver processing (e.g., for decoding of downlink transmissions in CSS). When a UE receives PDCCH/PDSCH on a component carrier (CC) using a specific TCI state, the UE may be aware of the PCI(s) of the one or more TRPs that are potentially transmitting the PDCCH/PDSCH. An association of each TCI state to the one or more PCIs may enable the UE receiving the transmission to be aware of potential PCIs to use for channel decoding.

In cases where a TCI state is associated with more than one PCI, the UE may select a PCI for any associated purpose (e.g., for descrambling CSS transmissions, etc.). In some cases a default PCI (e.g., a PCI to try first) may include the PCI with the smallest numeric value, the first PCI that the UE is made aware of after or during initial access (e.g., from a received SSB during initial access), the PCI of the TRP which has RLM resources configured, the PCI of the TRP which is configured as the TRP where the UE receives broadcast messages (e.g., remaining minimum system information (RMSI), other system information (OSI), paging, etc.), etc. In cases where a TCI state is not associated with a specific PCI (e.g., a single PCI), the UE may assume the default PCI is used. As discussed above, the default PCI may refer to the smallest PCI configured for the UE on a particular CC, the only PCI configured to the UE, the PCI of the configured RLM resources, the PCI that the UE is configured for receiving broadcast messages, etc.

TCI state and PCI association information may also improve RLM procedures in multi-TRP scenarios. That is, TCI state and PCI association may beneficially provide information of PCI on RLM resources with multiple TRPs (e.g., for RLM resources configured with a TCI state associated with multiple PCIs). For example, using TCI state and PCI association information, a UE may receive common signaling (e.g., synchronization signal blocks (SSBs), channel state information reference signals (CSI-RSs), etc.) from other TRPs on RLM resources (e.g., received using a TCI state that may be associated with those other TRPs). That is, in cases where an anchor TRP is failing, a UE may switch to monitoring reference signals from a second TRP using a PCI of the second TRP (e.g., that may also be associated with the TCI state used for receiving RLM-RSs), such that the UE may connect to other TRPs already in communication with the UE.

Therefore, in some scenarios, wireless communications systems employing multi-TRP transmission may further provide for dynamic TRP changes using TCI state and PCI association information (e.g., the number of TRPs or the anchor TRP serving a UE may vary due to listen-before-talk (LBT) or other unlicensed spectrum regulations, due to different transmission options from base station scheduling, etc.). For example, in some cases, an anchor TRP (e.g., a TRP originally providing connection to the UE after initial access procedures) may fail. Instead of the UE performing radio link failure (RLF) procedures (e.g., which may be associated with latency arising from random access channel (RACH) procedures or connection reestablishment procedures), it may be beneficial for the UE to instead stay connected to another TRP in communication with the UE, instead of declaring RLF. Using TCI state and PCI association, the UE may monitor for SSB/CSI-RS from a second TRP (e.g., corresponding to a PCI, other than the PCI of the anchor TRP, associated with the TCI state).

Generally, it may be beneficial for the UE to be able to identify an association between configured TCI states (e.g., specifically a TCI state being used by the UE for reception of certain communications) and PCIs corresponding to TRPs providing the transmissions to the UE. Such an association may be used by a UE for receiver processing (e.g., for downlink channel decoding) associated with CSS transmissions, RLM resource monitoring, etc. In cases where a TCI state is associated with multiple PCIs, the UE may select or identify one of the PCIs using the techniques described herein. As such, UEs may efficiently receive broadcast messages carried in PDSCH, dedicated messages using DCI format 1_0 in CSS, etc. from other TRPs (e.g., TRPs other than an anchor TRP, that are associated with the TCI state used by the UE for reception, and may be transmitting such information). Further, UEs may effectively receive RLM-RSs from TRPs other than the anchor TRP, that are associated with the TCI state used by the UE for reception of the RLM resources, by decoding the RLM resources using PCI of such other TRPs as indicated by the TCI state and PCI association (e.g., to potentially avoid RLF procedures in cases where the anchor TRP fails).

Aspects of the disclosure are initially described in the context of a wireless communications system. Process flows implementing discussed techniques are then described. Aspects of the disclosure are further illustrated by and described with reference to apparatus diagrams, system diagrams, and flowcharts that relate to association of TCI states to PCIs.

FIG. 1 illustrates an example of a wireless communications system 100 that supports TITLE in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105.

Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a remote radio head (RRH), a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. In some cases, a beam may refer to a spatial receive QCL association. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $Tf=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may insert periodic pilot symbols such as a cell-specific reference signal (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block (RB) based on the number of antenna ports or layers (up to 4) of the receiving UEs 115. In addition to CRS, which may be utilized by all UEs 115 in the coverage area 110 of the base station 105, demodulation reference signal (DMRS) may be directed toward specific UEs 115 and may be transmitted only on RBs assigned to those UEs 115. DMRS may include signals on 6 resource elements in each RB in which they are transmitted. The DMRS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as channel state information reference signals (CSI-RS) may be included to aid in generating channel state information (CSI). On the uplink, a UE 115 may transmit a combination of periodic sounding reference signal (SRS) and uplink DMRS for link adaptation and demodulation, respectively.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical broadcast channel (PBCH). The MIB may contain system bandwidth information, an SFN, and a physical hybrid automatic repeat request (HARD) indicator channel (PHICH) configuration. After decoding the MIB, the UE 115 may receive one or more Ms. For example, SIB1 may contain cell access parameters and scheduling information for other SIBs. Decoding SIB1 may enable the UE 115 to receive SIB2. SIB2 may contain RRC configuration information related to random access channel (RACH) procedures, paging, physical uplink control channel (PUCCH), physical uplink shared channel (PUSCH), power control, SRS, and cell barring. In some cases, a base station 105 may transmit synchronization signals (SSs) (e.g., PSS, SSS, and the like) using multiple beams in a beam-sweeping manner through a cell coverage area. For example, PSS, SSS, and/or broadcast information (e.g., a PBCH) may be transmitted within different synchronization signal (SS) blocks on respective directional beams, where one or more SS blocks may be included within an SS burst. In some cases, these SSs and RSs may be transmitted at different times and/or using different beams.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Different spatial layers may be associated with different antenna ports used for channel measurement and reporting. An antenna port is a logical entity used to map data streams to antennas. A given antenna port may drive transmissions from one or more antennas (e.g., and resolve signal components received over one or more antennas). Each antenna port may be associated with a reference signal (e.g., which may allow the receiver to distinguish data streams associated with the different antenna ports in a received transmission). In some cases, some antenna ports may be referred to as quasi co-located, meaning that the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial receive (Rx) parameters.

Accordingly, if a first set of antenna ports is quasi co-located with a second set of antenna ports (e.g., if a first set of antenna ports and a second set of antenna ports have a QCL relationship), a UE 115 may be able to perform channel estimation for demodulating data or control information received on the first set of antenna ports based on reference signals received on the second set of antenna ports. For example, the UE 115 may be able to determine a delay spread, a Doppler shift, etc., associated with a downlink transmission of data or control information on the first set of antenna ports based on the reference signals received on the second set of antenna ports. The UE 115 may then use a channel estimate (i.e., determined based on performing channel estimation as described herein) to correctly decode a downlink transmission from a base station 105. Thus, a QCL relationship between antenna ports used for downlink communications between a base station 105 and a UE 115 may improve the chances that the UE 115 may be able to successfully decode a downlink transmission from the base station 105. As such, it may be appropriate for a base station to transmit, to a UE, an indication of which antenna ports are quasi co-located such that the UE may be able to identify additional reference signals to use for channel estimation.

In wireless communications system 100, a base station 105 may configure a set of TCI states that correspond to different QCL relationships between antenna ports used for communication with a UE 115. A TCI state may be associated with a set of reference signals (e.g., SSBs) or different types of channel state information reference signals (CSI-RSs)), and the TCI state may indicate a QCL relationship between antenna ports used to transmit these reference signals and antenna ports used to transmit data or control information to a UE 115. For example, each configured TCI state may include a reference signal set and may include parameters for configuring QCL relationship between the reference signals in the reference signal set and a second reference signal (e.g., a DMRS) port group. As such, when a UE 115 receives an indication of a particular TCI state from a base station 105 (e.g., in downlink control information (DCI), RRC message, etc.), the UE 115 may identify that antenna ports used to transmit the reference signals associated with the TCI state are quasi co-located with antenna ports used to transmit data and control information to the UE 115. Thus, the UE 115 may use the reference signals associated with the TCI state to perform channel estimation for demodulating data or control information received from the base station 105. For example, the UE 115 may determine a delay spread, Doppler shift, Doppler spread, a Doppler average, delay receive parameter(s), spatial receive parameter(s), etc., associated with a transmission of data or control information based on the reference signals associated with the TCI state.

In some cases, a base station 105 may use RRC signaling, MAC-CE signaling, or PDCCH signaling to configure a UE 115 with a list or set of M (e.g., 8, 64, etc.) TCI states corresponding to different QCL relationships between antenna ports used for downlink communication with the UE 115. For example, the base station 105 may use an N-bit indicator (e.g., a 3-bit indicator) to indicate a TCI state to the UE 115 (e.g., where M≥$2^N$). In some cases, each configured TCI state may include a reference signal set and may include parameters for configuring QCL relationship between the reference signals (e.g., reference signal resources) in the reference signal set and a second reference signal (e.g., a DMRS) port group. In some cases a candidate set of downlink reference signals may be configured using an RRC mechanism. Each state of the set of M TCI states may be RRC configured with a downlink reference signal set used as a QCL reference, and a base station 105 may use MAC-CE signaling to select up to $2^N$ TCI states out of the set of M TCI states for PDSCH QCL indication (e.g., base station 105 may select a TCI state to indicate antenna port group QCL relationships).

A base station 105 may configure a UE 115 with a set of possible TCI states (e.g., via MAC-CE signaling, DCI, etc.). The base station 105 may further provide the UE 115 with an association between a set of PCIs (e.g., associated with multiple TRPs of the base station) and the set of TCI states. For example, the base station 105 may transmit an indication of the association to the UE 115 (e.g., the base station may transmit TCI state and PCI association information to the UE 115), and may subsequently indicate various TCI states to use for different downlink communications with the UE 115 (e.g., based on which TRP(s) the base station 105 may utilize to transmit different downlink transmissions). The UE 115 may then identify a TCI state to use for reception of some downlink transmission (e.g., based on a TCI state indication received from the base station 105), and may identify one or more PCIs associated with the TCI state based on the received TCI state and PCI association information. In cases where multiple PCIs are associated with a TCI state used for reception, a default PCI may be selected from the multiple PCIs. As such, the UE 115 may decode received downlink transmissions using the identified PCI (e.g., as the downlink transmission may have been scrambled by the serving TRP using its PCI). In some cases, the UE 115 may identify that a TRP has RLM resources configured for the UE 115 and may receive a downlink transmission using a PCI of the TRP that has RLM resources configured (e.g., which may provide for RLM procedures with TRPs other than an anchor TRP, for example, in cases where an anchor TRP fails).

In some examples, a UE 115 may identify an association between a set of reference signals for RLM and a set of PCIs identifying TRPs serving the UE 115. As such, the UE 115 may receive reference signals from one or more of the serving TRPs and may identify a PCI to use to decode the received reference signals (e.g., based on the association between the set of reference signals for RLM and the set of PCIs, the TCI state used to receive the reference signal and the TCI state and PCI association information, etc.). As such, a UE 115 may identify a service state (e.g., an in-synchronization (IS) state or out-of-synchronization (OOS) state) for various TRPs serving the UE 115. In some cases, the UE 115 may determine a signal strength of a first received reference signal is greater than a signal strength of the received second reference signal. In such cases, the PCI identified to be used to decode the downlink transmission may be based on the determination. Further, such service state determinations for different TRPs may be used to switch an anchor TRP of the UE 115 to another TRP serving the UE 115.

Figure 2:
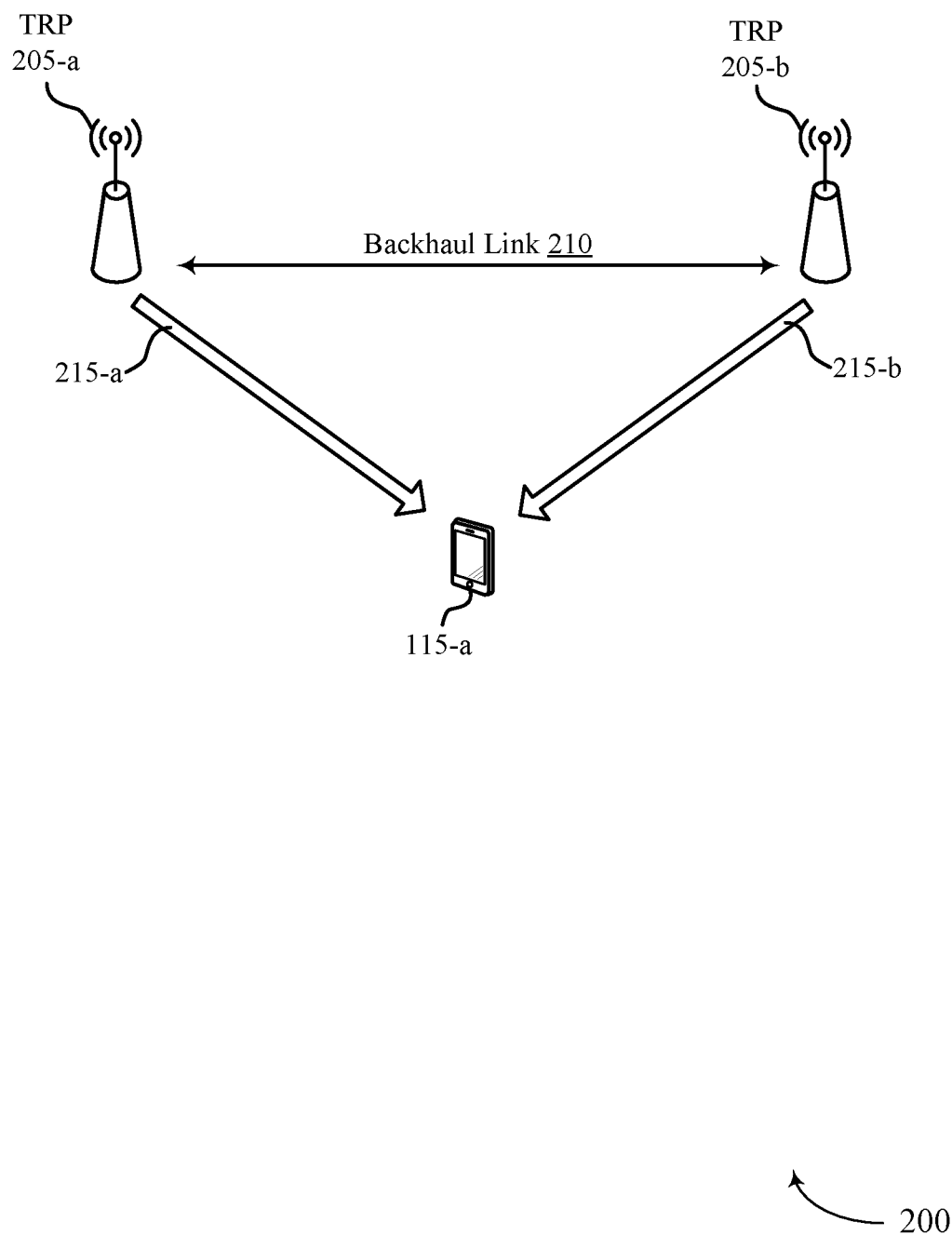
FIG. 2 illustrates an example of a wireless communications system that supports association of TCI states to PCIs in accordance with aspects of the present disclosure.

FIG. 2 illustrates an example of a wireless communications system 200 that supports association of TCI states to PCIs in accordance with aspects of the present disclosure. In some examples, wireless communications system 200 may implement aspects of wireless communications system 100. For example, wireless communications system 200 may include a UE 115-*a*, as well as TRP 205-*a* and TRP 205-*b* which may be associated with a base station 105, all of which may be example of the corresponding devices as described with reference to FIG. 1. For example, TRP 205-*a* and TRP 205-*b* may be connected via backhaul link 210, and may thus be tightly synchronized. In wireless communications system 200, a base station may indicate an association between TCI states and PCIs of TRP 205-*a* and TRP 205-*b* to UE 115-*a*. Wireless communications system 200 may employ multi-TRP transmissions (e.g., transmissions from TRP 205-*a* and TRP 205-*b*) via downlink 215-*a* and downlink 215-*b*. Such multi-TRP transmissions may include PDSCH transmission, PDCCH transmission, DCI, downlink RRC signaling, etc.

As described with reference to FIG. 1, a base station 105 may include subcomponents such as an access network entity, and each access network entity may communicate with UE 115-*a* through a number of other access network transmission entities (e.g., such as an RRH, a smart radio head, a TRP, etc.). Various functions of each access network entity or base station 105 may be distributed across various network devices (e.g., radio heads, access network controllers, TRPs) or consolidated into a single network device (e.g., a base station 105). TRP 205-*a* and TRP 205-*b* may thus refer to different antenna ports associated with a cell ID, and may be collocated or distributed. For example, TRP 205-*a* may refer to a base station 105 and TRP 205-*b* may refer to an RRH associated with the base station 105. In other examples, TRP 205-*a* and TRP 205-*b* may each be an RRH associated with some base station 105. In some cases, some base station 105 functionality may be distributed across TRP 205-*a* and TRP 205-*b*, while other functionality may be centralized, leaving flexibility and scope for different deployments to fulfil requirements for specific use cases. That is, a base station 105 may support both distributed and centralized deployments, where TRP 205-*a* and TRP 205-*b* may include a configurable part of the protocol stack. Such may provide pooling gains with centralized functionalities (e.g., for mobility handling, scheduling decisions, etc.). In some examples, TRP 205-*a* and TRP 205-*b* may be associated with different base stations 105.

In wireless communications system 200, TRP 205-*a* and TRP 205-*b* may communicate with UE 115-*a*, at the same or different times, in a transparent manner (e.g., to improve transmission reliability, increase throughput, etc.). For example, TRP 205-*a* and TRP 205-*b* may jointly transmit PDCCH transmissions, PDSCH transmissions, reference signals (e.g., demodulation reference signals), etc. to UE 115-*a*. In some cases, backhaul link 210 between TRP 205-*a* and TRP 205-*b* may be associated with different backhaul conditions. For example, as the backhaul link 210 approaches a zero-delay ideal backhaul link, wireless communications system 200 may provide unlimited capacity and dynamic coordination. As another example, for a non-ideal backhaul link (e.g., with delay ≥5 ms), wireless communications system 200 may provide limited capacity and semi-static coordination.

A base station (e.g., TRP 205-*a* and/or TRP 205-*b*) may configure a set of possible TCI states (e.g., a set including M TCI states) that correspond to both different QCL relationships between antenna ports used for downlink communications with a UE 115-*a* and different QCL relationships between one or more port groups of a reference signal resource and port groups of a target reference signal. The base station may then use these TCI states to indicate, to UE 115-*a*, different QCL relationships between antenna ports and antenna port configurations used for downlink communications with UE 115-*a*. For example, the base station may transmit an indication (e.g., TCI state indication) that a first set of antenna ports used to transmit periodic CSI-RSs to UE 115-*a* are quasi co-located with a second set of antenna ports used to transmit data or DMRS to the UE 115-*a*. Accordingly, UE 115-*a* may perform channel estimation for demodulating the data received on the second set of antenna ports using the CSI-RSs received on the first set of antenna ports (e.g., in addition to DMRSs received on the second set of antenna ports). As discussed above, TRP 205-*a* and TRP 205-*b* may, in some cases, refer to different antenna ports associated with a cell ID.

In some cases, TRP 205-*a* and TRP 205-*b* may each be associated with a PCI, and may transmit communications jointly or independently to UE 115-*a*. For example, in some cases, beamforming may be achieved by combining the signals communicated via TRP 205-*a* and TRP 205-*b* such that signals propagating at particular orientations with respect to TRP 205-*a* and TRP 205-*b* may experience constructive interference while others experience destructive interference. In other cases, TRP 205-*a* or TRP 205-*b* may independently transmit signals to UE 115-*a*. Generally, a UE in a multi-TRP scenario may thus receive communications using a variety of possible TCI states. In some cases, TCI states may be associated with multiple PCIs. That is, in some cases, UE 115-*a* may use a TCI state for reception of downlink communications, but may otherwise be unaware of what TRP or TRPs are transmitting the downlink communications. It may be desirable for the UEs to be aware of PCIs associated with each TRP serving the UE.

For example, in a multi-TRP scenario, different TRPs may be used individually or in combination to transmit on a variety of different beams (e.g., each corresponding to a different TCI state). If a UE knows which TCI state to use to receive the downlink transmission, but doesn't know the corresponding PCI (e.g., in cases where a single TRP, other than the anchor TRP, transmits the downlink transmission), the UE may be unable to effectively process the downlink channel (e.g., as the UE may not know the PCI associated with the transmission). Therefore the described techniques may provide for TCI state and PCI association, such that a UE may identify one or more PCIs associated with a TCI state in use. Further, the UE may, in cases where the TCI state is associated with multiple PCIs, select a default PCI (e.g., to use or try first for descrambling PDSCH/PDCCH, RLM resource monitoring, etc.) according to the techniques described. As such, the UE may know the PCI associated with each TRP, and the PCI association for each beam (e.g., or TCI state) used by the one or more TRPs. Example scenarios where PCI associations may be used are now discussed.

UE 115-*a* may receive PDSCH/PDCCH using N different TCI states across the two TRPs (e.g., TRP 205-*a* and TRP 205-*b*). UE 115-*a* may be aware of TCI state and PCI association information, and may therefore be aware of what TCI states are coming from which TRP(s) (e.g., the UE 115-*a* may be aware of whether a used TCI state is associated with TRP 205-*a*, TRP 205-*b*, or both, based on the TCI state and PCI association information that indicates PCI(s) associated with a particular TCI state). In some cases, UE 115-*a* may be reached using PDCCH format 1_0 in CSS. For example, if the UE 115-*a* goes into RRC reconfiguration, the UE 115-*a* may be reached using DCI 1_0 on CSS to avoid scrambling ID ambiguity of PDCCH/PDSCH data. Now, using the TCI state and PCI association information, UE 115-*a* may be able to receive PDCCH/PDSCH from both TRP 205-*a* and/or TRP 205-*b* (e.g., as TRP 205-*a* and TRP 205-*b* may scramble CSS PDCCH/PDSCH using their respective PCI, and the UE 115-*a* may be aware of both PCIs based on the TCI state used by the UE 115-*a*).

That is, in some cases (e.g., for CSS signaling), a TRP may scramble data (e.g., of a transmission) based on its PCI. For example, a TRP may scramble PDSCH using a PCI of the TRP when the PDSCH is scheduled using DCI format 1_0 in CSS. More generally, broadcast messages carried in PDSCH (e.g., remaining minimum system information (RMSI), other system information (OSI), paging, random access channel (RACH) response, etc.) and dedicated messages using DCI format 1_0 in CSS, may be scrambled with PCI of the signaling TRP. In other examples, radio resource control (RRC)-configured virtual cell ID may be used to scramble PDSCH if radio network temporary identifier (RNTI) of PDSCH equals cell RNTI (C-RNTI) or configured scheduling RNTI (SC-RNTI). However, in cases where PDSCH is scrambled using PCI (e.g., in the scenarios discussed above), UE 115-a may identify TCI state and PCI association, such that the UE 115-a may identify the PCI used to scramble PDSCH based on the TCI state the UE 115-a uses to receive the PDSCH transmission. As such, UE 115-a may receive PCI scrambled PDCSH from any TRP serving the UE 115-a (e.g., from both TRP 205-a or TRP 205-b).

PDCCH transmissions may also be scrambled using PCI of the transmitting TRP. For example, when PDCCH is scrambled using random access RNTI (RA-RNTI), system information RNTI (SI-RNTI), paging RNTI (P-RNTI), and C-RNTI in CSS, the PCI of the transmitting TRP may be used. Again, UE 115-a may identify TCI state and PCI association, such that the UE 115-a may identify the PCI used to scramble PDCCH based on the TCI state the UE 115-a uses to receive the PDCCH transmission. UE 115-a may receive PCI scrambled PDCCH from any TRP serving the UE 115-a (e.g., from both TRP 205-a or TRP 205-b).

In some examples, the shift index of the interleaved control channel element (CCE) to resource element group (REG) mapping of a control resource set (CORESET) may also use the PCI in cases where a CORESET is configured by system information block (SIB) 1 (SIB1) or physical broadcast channel (PBCH). A shift index (shiftIndex) may correspond to a layer 1 (L1) parameter (e.g., CORESET-shift-index). When the field is absent, the UE may apply the value of the PCI (e.g., physCellId) configured for the serving cell. Such cases may be another instance where UE 115-a may utilize the PCI (e.g., of non-anchor TRPs) to identify the shift index of the interleaved CCE-to-REG mapping of a CORESET configured by SIB1 or PBCH associated with another TRP.

UE identification of TCI state and PCI association may also be beneficial for RLM resource monitoring. For example, in some cases, wireless communications system 200 may support configuration of X RLM-RS resource(s) for a UE 115-a. For less than 3 GHz, for example, X=2. For above 3 GHz and below 6 GHz, for example, X=4. For above 6 GHz, for example, X=[8]. In some cases, an RLM-RS resource may include a SS block or a CSI-RS. In some cases, wireless communications system 200 may support configurability of different RLM-RS types to UE 115-a for each RLM-RS. RLM-RS resources may be UE-specific (e.g., specific to UE 115-a) and configured by RRC. In some cases, RLM-RS may be undefined until explicitly configured (e.g., the network may configure RLM-RS for the UE 115-a to perform RLM). In multi-TRP scenarios, using the described techniques, UE 115-a may identify a TCI state associated with an RLM resource, and may further identify which PCI are associated with the TCI state (e.g., based on the TCI state and PCI association). As such, the UE 115-a may be able to receive RLM-RS from different TRPs serving the UE 115-a (e.g., on the RLM resources) using the identified PCI.

For example, wireless communications system 200 may provide periodic in-synchronization (IS) and out-of-synchronization (OOS) indications. For RLM, both SS block based RLM and CSI-RS based RLM may be supported. In some cases, a PDCCH block-error-rate (BLER) (e.g., based on RLM-RS signal-to-interference-plus-noise ratio (SINR)) may be a metric for determining IS or OOS with the cell or TRP. That is, periodic IS may be indicated if the estimated link quality (e.g., hypothetical PDCCH BLER) of at least one RLM-RS resource among all configured RLM-RS resource(s) is above some predetermined threshold (e.g., Q_in threshold). Periodic OOS may be indicated if the estimated link quality (e.g., hypothetical PDCCH BLER) of all configured RLM-RS resource(s) is below a predetermined threshold (e.g., Q_out threshold). As such, in cases where a UE is only aware of the anchor TRP and the anchor TRP fails (e.g., has all RLM-RS resources below Q_out threshold), the UE may declare RLF even though other TRPs serving the UE may be able to provide service for the UE. Using the described techniques (e.g., TCI state and PCI association), UE 115-a may be able to switch its anchor TRP if an IS signal is coming from another TRP (e.g., other than a current anchor TRP that is OOS). As such, UE 115-a may either stay in IS or switch from OOS to IS when the IS signal is coming from a TRP other than the current anchor TRP. That is, the network may configure RLM-RS transmitted from multiple TRPs, and the UE 115-a may be aware of which RS is associated with which PCI (e.g., based on the TCI state associated with the RLM-RS resource).

Consider an example scenario where TRP 205-a and TRP 205-b are serving UE 115-a, and TRP 205-a is the anchor TRP. The network (e.g., a base station via TRP 205-a and/or TRP 205-b) may indicate a TCI state and PCI association to UE 115-a (e.g., via RRC signaling, etc.). The TCI state and PCI association may include an association of each TCI state to PCI of TRP 205-a and/or PCI of TRP 205-b. In cases where a TCI state is associated with both PCI of TRP 205-a and PCI of TRP 205-b, the TCI state may be referred to as being association with multiple PCI (e.g., such that UE 115-a may select a default PCI from the multiple PCIs when using the TCI state associated with the multiple PCIs). TCI states may thus be configured by the network (e.g., via DCI as discussed above), and each TCI state may have association PCI(s) corresponding to the TRPs in communication with the UE 115-a.

In a first example, the network may configure RLM-RS transmitted from the anchor TRP (e.g., TRP 205-a) as well as other TRPs (e.g., secondary TRPs, such as TRP 205-b). In cases where the anchor TRP 205-a fails, the UE 115-a may monitor for RSs, and may identify a TCI state associated with RLM resources, such that the UE 115-a may receive RSs from TRP 205-b. In cases where RLM-RS resource(s) associated with TRP 205-b is above some predetermined threshold (e.g., Q_in threshold), the UE 115-a may stay in IS or switch from OOS to IS (e.g., based on the IS signal received from TRP 205-b). That is, the UE 115-a may classify RLM metrics into different TRP groups, and decide the IS and OOS for each TRP. The UE 115-a may still report a single IS and OOS, however the IS and OOS per TRP may be used by the UE 115-a to decide whether the anchor TRP should be switched (e.g., from TRP 205-a to TRP 205-b). Therefore, as long as the signal from one of the TRPs serving the UE 115-a is strong enough (e.g., one of the TRPs associated with the TCI state used by UE 115-a to receive RLM-RS), the UE 115-a stay in IS or switch from OOS to IS.

To make use of other TRPs for RLF, the RLM-RS may include the SSB/CSI-RS from other TRPs (e.g., from TRP 205-b). The UE 115-a may use the TCI state and PCI association information, and identify a PCI to use to read the common signaling. In some cases, the UE 115-a may also report IS state per TRP (e.g., internal to the UE 115-a so the UE 115-a may know which PCI to use). If an RS is associated with multiple TRPs (e.g., the TCI state has multiple PCIs), then the UE 115-a may use a default PCI of the multiple PCIs to read the common signaling. That is, using TCI state and PCI association information, the UE 115-a may switch to monitoring common signaling (e.g., broadcast, etc.) from a secondary TRP (e.g., such as TRP 205-*b*). The UE 115-*a* may be configured with an RLM resource configured with a TCI state. If the anchor TRP fails, the UE 115-*a* may identify a secondary TRP, and use the PCI associated with the secondary TRP (e.g., based on the TCI state and PCI association information). In other words, the UE 115-*a* may associate each RS with one or more PCI (e.g., based on the TCI state). Depending on the strength of each RS, the UE 115-*a* may perform the common signal reading using the PCI associated with the strongest RS (e.g., the RS associated with the best SINR, the best reference signal received power (RSRP), the best reference signal received quality (RSRQ), etc.). When the strongest RS is associated with multiple PCIs, the UE 115-*a* may select or identify the default PCI (e.g., according to the various examples for how to select a default PCI out of multiple PCI described herein).

In a second example, considering the above described scenario in wireless communications system 200, both TRP 205-*a* and TRP 205-*b* may send PDCCH/PDSCH on a CC. In such multi-TRP scenarios, reception of PDCCH/PDSCH using DCI 1_0 in CSS may thus benefit from UE identification of PCIs associated with each of TRP 205-*a* and TRP 205-*b* (e.g., via TCI state and PCI association information).

In cases where a TCI state is associated with multiple PCIs, a default PCI may be identified (e.g., scrambling ID identification, for RLM applications discussed above, etc.). In some cases, a default PCI identified may include the PCI with the smallest numerical value out of the multiple PCI associated with the TCI state. In other examples, the default PCI may be the first PCI that the UE was aware of after initial access (e.g., the first PCI detected in a received SSB or, in some cases, the PCI of the anchor TRP transmitting an SSB during initial access procedure). In other cases, the default PCI may refer to the PCI of the TRP which has RLM resources configured. In yet other examples, the default PCI may refer to the PCI of the TRP which is configured as the TRP where the UE received broadcast messages (e.g., RMSI, OSI, paging). The four examples of how to select a default (e.g., or a first tried or first used) PCI out of multiple PCIs that may be associated with a TCI state are for exemplary purposes. Other methods for a UE 115-*a* selection of a PCI out of multiple PCI associated with a TCI state may be employed. In some cases, the PCI of the anchor TRP may be used as default when a TCI state is associated with multiple PCI. In some examples, if the default PCI is incorrect, the UE may try the remaining PCI (e.g., to receive or descramble a PDCCH/PDSCH transmission in CSS). In general, if a TCI state is not associated with a specific PCI (e.g., a single PCI), the UE 115-*a* may assume the "default PCI" is used. The default PCI may be the smallest PCI configured to the UE 115-*a* for the CC, the only PCI configured to the UE 115-*a*, the PCI of the configured RLM resource, the PCI that the UE 115-*a* is configured to receive broadcast messages with, etc.

The TCI state and PCI association information described herein may thus provide for improved RLM procedures (e.g., as the UE 115-*a* may monitor for RLM-RS from secondary TRPs, and may switch anchor TRPs without necessarily declaring RLF due to a first anchor TRP failure) and may enable the UE 115-*a* to receive PDSCH/PDCCH transmissions from secondary TRPs (e.g., from TRPs serving the UE 115-*a* other than the anchor TRP) in CSS. The UE 115-*a* may be aware of both PCIs (e.g., or all PCIs in cases where the UE is being served by more than two TRPs, the TCI state is associated with more than two PCIs, etc.), and may be aware of the association of TCI states with the PCIs such that when the UE 115-*a* tries to get PDCCH scrambled with a PCI on a specific TCI state, the UE 115-*a* may identify which PCI to use.

Figure 3:
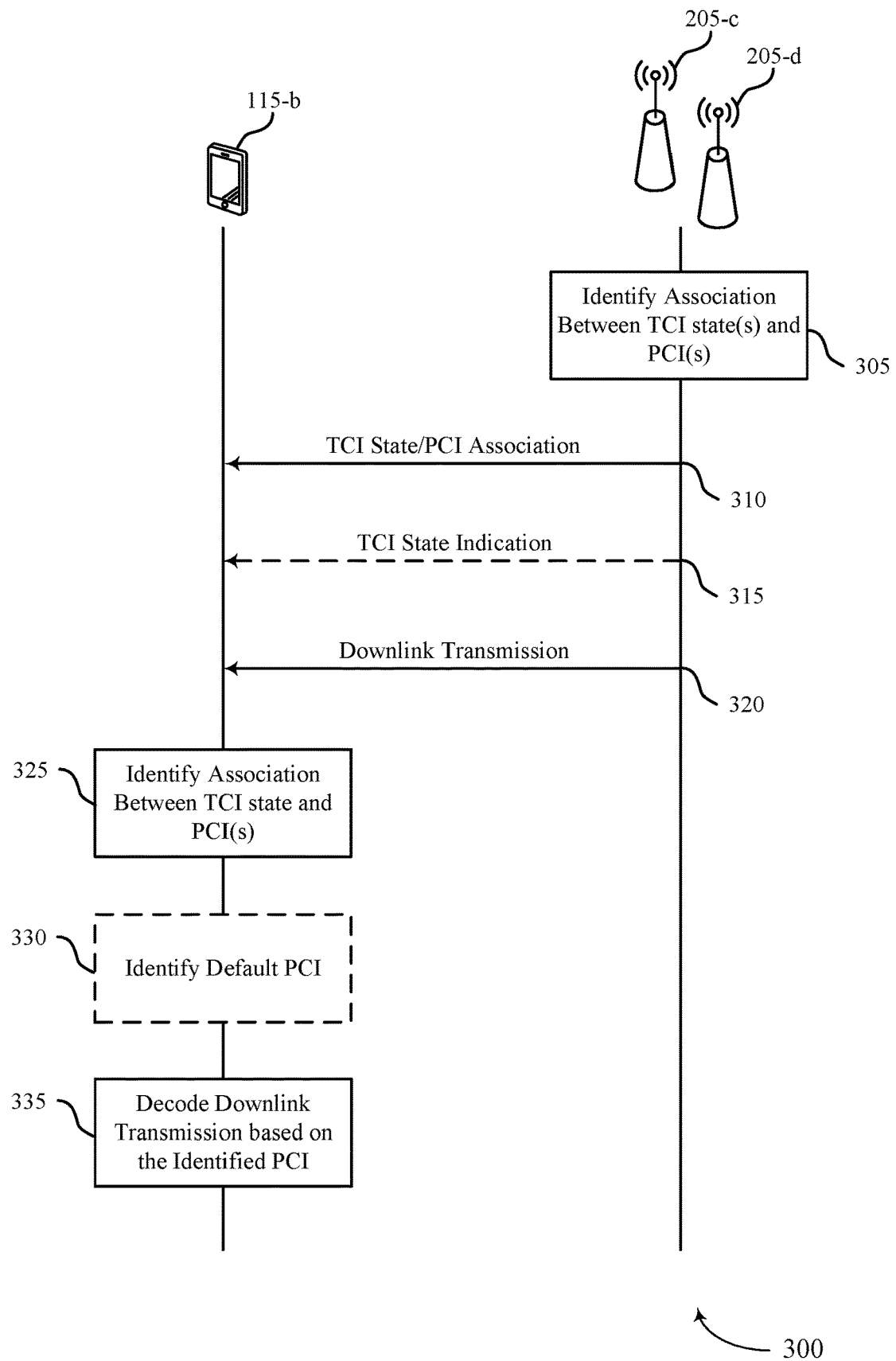
FIG. 3 illustrates an example of a process flow that supports association of TCI states to PCIs in accordance with aspects of the present disclosure.

FIG. 3 illustrates an example of a process flow 300 that supports association of TCI states to PCIs in accordance with aspects of the present disclosure. In some examples, process flow 300 may implement aspects of wireless communications system 100 and wireless communications system 200. Process flow 300 includes UE 115-*b* and TRPs 205-*c* and 205-*d*, which may be examples of TRPs 205 (e.g., and aspects of base stations 105) and UEs 115 as described with reference to FIGS. 1 and 2. Process flow 300 may illustrate base station or network configuration and conveyance of TCI state and PCI association, as well as UE 115-*b* identification of PCI for use in decoding downlink transmissions from TRP 205-*c* and/or TRP 205-*d*. In the following description of the process flow 300, the operations between the UE 115-*b*, the TRP 205-*c*, and the TRP 205-*d* may be transmitted in a different order than the exemplary order shown, or the operations performed by UE 115-*b*, TRP 205-*c*, and TRP 205-*d* may be performed in different orders or at different times. In some cases, certain operations may also be left out of the process flow 300, or other operations may be added to the process flow 300.

At 305, a base station (e.g., associated with one or both of TRP 205-*c* and TRP 205-*d*) may identify an association between a set of PCIs and a set of TCI states for UE 115-*b*. For example, a base station may identify an association between a PCI identifying TRP 205-*c*, a PCI identifying TRP 205-*d*, and one or more TCI states associated with TRP 205-*c* and/or TRP 205-*d* transmission to UE 115-*b*. In some cases, the TCI state and PCI association information may include a list of PCIs associated with TRPs serving UE 115-*a* (e.g., PCI of TRP 205-*c* and PCI of TRP 205-*d*) and TCI state identification information for each TCI state associated with each listed PCI. In other cases, the TCI state and PCI association information may include a list of TCI states as well as PCIs for each TRP associated with the TCI state (e.g., PCI of the one or more serving TRPs corresponding to each TCI state).

At 310, the base station may transmit an indication of the identified association (e.g., the TCI state and PCI association identified at 305) to UE 115-*b*. In some cases, the association information may be transmitted using RRC signaling. In some cases, the association information may be transmitted to the UE 115-*b* via TRP 205-*c* and/or TRP 205-*d*.

At 315, the base station may, in some cases, transmit a TCI state indication to UE 115-*b*. For example, in some cases, the base station may transmit an indication of a TCI state (e.g., identification of a certain configured TCI state, via DCI), for UE 115-*b* use in receiving a subsequent transmission. In some cases, the base station may not transmit an indication of a TCI state prior to the downlink transmission (e.g., and the UE 115-*b* may assume or autonomously identify a TCI state).

At 320, the base station (e.g., TRP 205-*c* and/or TRP 205-*d*) may transmit a downlink transmission encoded according to a first PCI (e.g., associated with TRP 205-*c*) or a second PCI (e.g., associated with TRP 205-*d*), based on the association identified at 305 and the TCI state associated with the downlink transmission. For example, in some cases, TRP 205-*c* may transmit the downlink transmission, and may scramble the downlink transmission using the first PCI (e.g., which identifies the TRP 205-*c*). In other examples, TRP 205-*d* may transmit the downlink transmission, and may scramble the downlink transmission using the second PCI (e.g., which identifies the TRP 205-*d*). In some cases, the downlink transmission includes a downlink control channel signal in the common search space (e.g., PDCCH in CSS) or downlink data channel signal in the common search space (e.g., PDSCH in CSS), etc. The UE 115-*b* may monitor for the downlink transmission in CSS.

At 325, UE 115-*b* may identify an association between the TCI state used to receive the downlink transmission at 320, and PCI of TRP 205-*c* and/or TRP 205-*d*. For example, in some cases, a downlink transmission from TRP 205-*c* and a downlink transmission from TRP 205-*d* may each be associated with a different TCI state. In such cases, a TCI state used to receive the downlink transmission may, in this example, may be associated with one of either the first PCI or the second PCI. In other cases, a downlink transmission from TRP 205-*c* and a downlink transmission from TRP 205-*d* may each be associated with a same TCI state (e.g., the TCI used by UE 115-*b* for receiving the downlink transmission at 320 may be associated with multiple PCIs, namely the first PCI and the second PCI).

In cases where the TCI state used by UE 115-*b* for reception is associated with multiple PCI, the UE 115-*b* may identify or select a default PCI from the multiple associated PCI at 330. For example, the UE 115-*b* may identify a default PCI (e.g., the first PCI identifying TRP 205-*c*) based on the techniques described herein (e.g., the default PCI may be the smallest PCI configured to the UE 115-*b* for the CC, the only PCI configured to the UE 115-*b*, the PCI of the configured RLM resource, etc.). UE 115-*b* may, in some examples, identify that one of TRP 205-*c* or TRP 205-*d* has RLM resources configured for the UE 115-*b*, and may identify the first PCI identifying TRP 205-*c* or the second PCI identifying TRP 205-*d* according to the one of TRP 205-*c* or TRP 205-*d* having the RLM resources configured. In some cases, UE 115-*b* may determine that the UE 115-*b* became aware of the first PCI during an initial access procedure (e.g., the first PCI obtained from a received SSB) prior to the second PCI (e.g., a later obtained PCI), and the first PCI may be identified based on the determination. In some cases, UE 115-*b* may determine that the first PCI has a smaller value than the second PCI, and may identify the PCI based on that determination.

At 335, UE 115-*b* may decode the downlink transmission received at 320 using the identified PCI.

Figure 4:
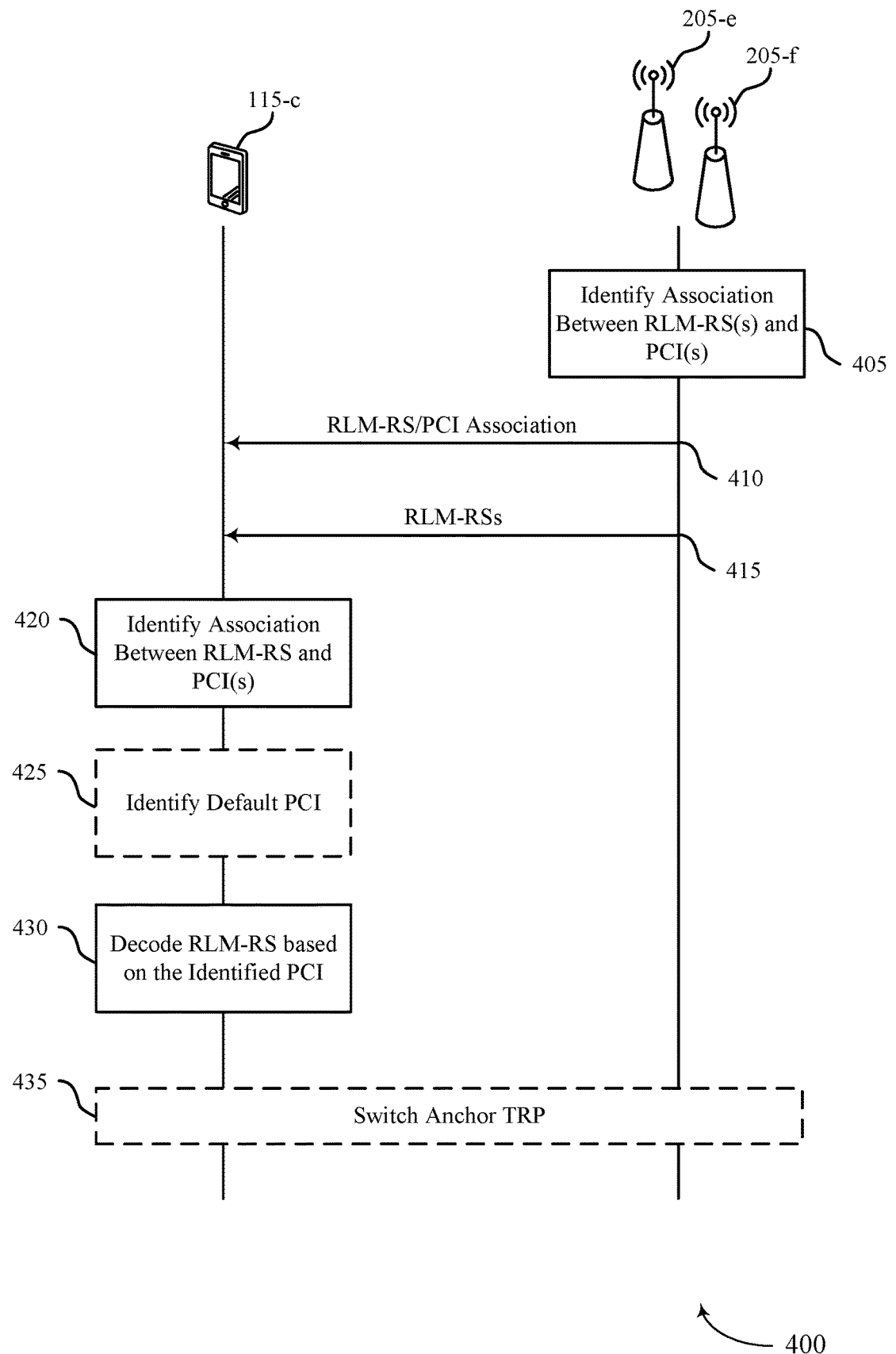
FIG. 4 illustrates an example of a process flow that supports association of TCI states to PCIs in accordance with aspects of the present disclosure.

FIG. 4 illustrates an example of a process flow 400 that supports association of TCI states to PCIs in accordance with aspects of the present disclosure. In some examples, process flow 400 may implement aspects of wireless communications system 100 and wireless communications system 200. Process flow 400 includes UE 115-*c* and TRPs 205-*e* and 205-*f*, which may be examples of TRPs 205 (e.g., and aspects of base stations 105) and UEs 115 as described with reference to FIGS. 1 and 2. Process flow 400 may illustrate base station or network configuration and conveyance of TCI state and PCI association, as well as UE 115-*c* identification of PCI for use in receiving reference signals (e.g., RLM-RSs) from TRP 205-*e* and/or TRP 205-*f*. In the following description of the process flow 400, the operations between the UE 115-*c*, the TRP 205-*e*, and the TRP 205-*f* may be transmitted in a different order than the exemplary order shown, or the operations performed by UE 115-*c*, TRP 205-*d*, and TRP 205-*f* may be performed in different orders or at different times. In some cases, certain operations may also be left out of the process flow 400, or other operations may be added to the process flow 400.

At 405, a base station (e.g., associated with one or both of TRP 205-*e* and TRP 205-*f*) may identify an association between a set of PCIs and a set of reference signals for RLM (e.g., a set of RLM-RS(s)) with UE 115-*c*. For example, a base station may identify an association between a PCI identifying TRP 205-*e*, a PCI identifying TRP 205-*f*, and one or more RLM reference signals that may be transmitted by TRP 205-*e* and/or TRP 205-*f* to UE 115-*c*.

At 410, the base station may transmit am indication of the RLM-RS and PCI association (e.g., identified at 405) to UE 115-*c*. In some cases, the indication may be transmitted via RRC signaling.

At 415, UE 115-*c* may receive a first reference signal from TRP 205-*e* and may receive a second reference signal from TRP 205-*f*. In some cases, the first and/or second reference signal may include an SSB, a CSI-RS, etc.

At 420, UE 115-*c* may identify, based on the received first reference signal, the received second reference signal, and the identified association between the set of PCIs and the set of reference signals for RLM, a PCI of the set of PCIs to use to decode a downlink transmission received from at least one of TRP 205-*e* and TRP 205-*f*.

In cases where the RLM reference signal (e.g., or TCI state used by UE 115-*c* for reception) is associated with multiple PCI, the UE 115-*c* may identify or select a default PCI from the multiple associated PCI at 425. For example, the UE 115-*c* may identify a default PCI (e.g., the first PCI identifying TRP 205-*e*) based on the techniques described herein (e.g., the default PCI may be the smallest PCI configured to the UE 115-*c* for the CC, the only PCI configured to the UE 115-*c*, the PCI of the configured RLM resource, etc.). UE 115-*c* may, in some examples, identify that one of TRP 205-*e* or TRP 205-*f* has RLM resources configured for the UE 115-*c*, and may identify the first PCI identifying TRP 205-*e* or the second PCI identifying TRP 205-*f* according to the one of TRP 205-*e* or TRP 205-*f* having the RLM resources configured. In some cases, UE 115-*c* may determine that the UE 115-*c* became aware of the first PCI during an initial access procedure (e.g., the first PCI obtained from a received SSB) prior to the second PCI (e.g., a later obtained PCI), and the first PCI may be identified based on the determination. In some cases, UE 115-*c* may determine that the first PCI has a smaller value than the second PCI, and may identify the PCI based on that determination.

In some cases UE 115-*c* may transmit a report of service states for at least one of the set of TRPs (e.g., for TRP 205-*e* and TRP 205-*f*), the service states including an in service state (e.g., IS) or an out of service state (e.g., OOS).

At 430, UE 115-*c* may decode the downlink transmission received using the identified PCI. For example, in some cases, UE 115-*c* may determine that a signal strength of the received first reference signal greater than a signal strength of the received second reference signal, and the PCI may be identified to use to decode the downlink transmission based at least in part on the determination, and the PCI identifies the first TRP.

Figure 5:
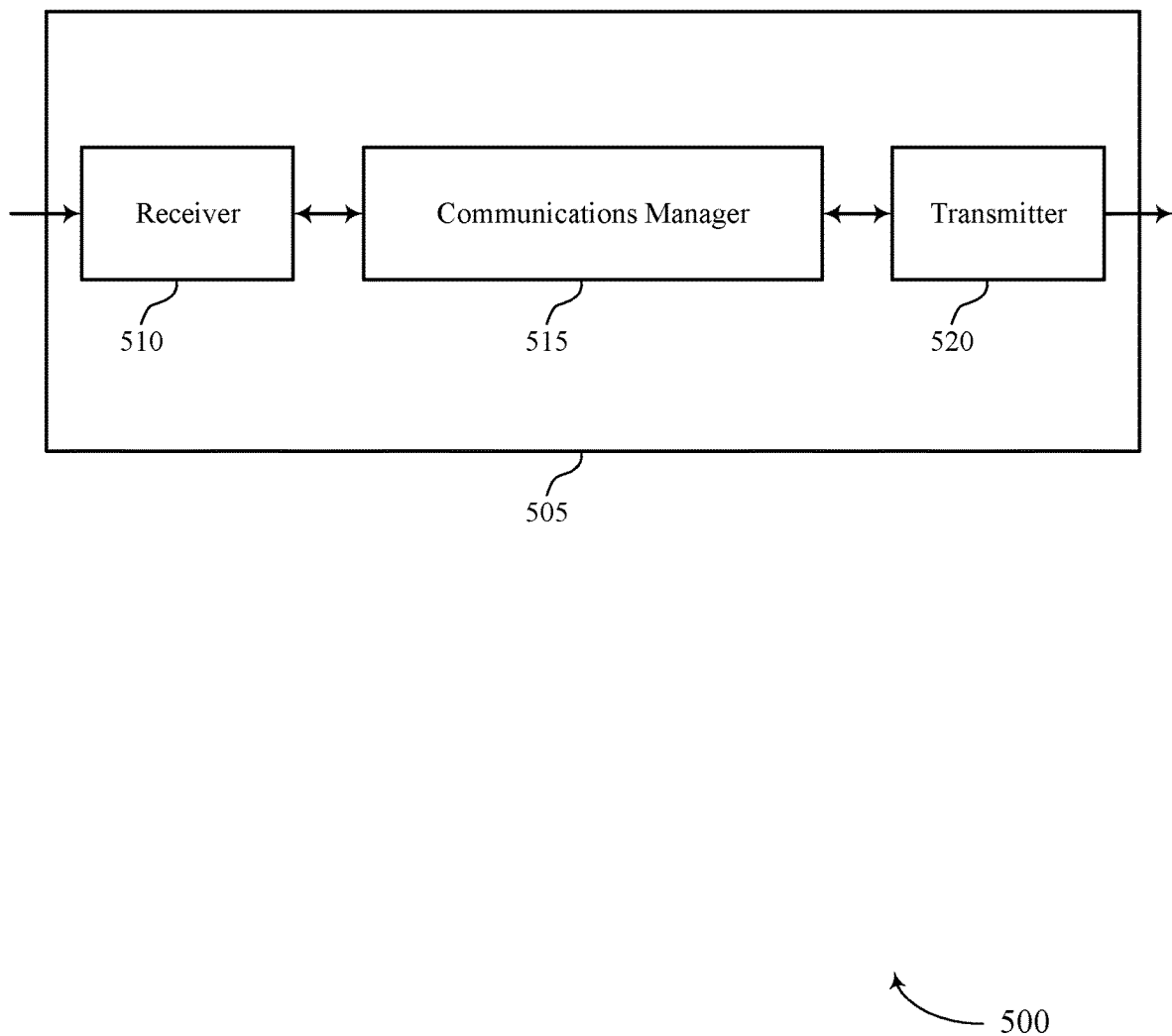
FIGS. 5 and 6 show block diagrams of devices that support association of TCI states to PCIs in accordance with aspects of the present disclosure.

At 435, the network may, in some cases, switch the anchor TRP for UE 115-*c* (e.g., the base station or network may switch the anchor TRP from TRP 205-*e* to TRP 205-*f*). For example, in some cases, UE 115-*c* may determine that a signal strength of the received first reference signal is less than a predetermined signal strength threshold and determine to switch an anchor TRP from the first TRP to the second TRP FIG. 5 shows a block diagram 500 of a device 505 that supports association of TCI states to PCIs in accordance with aspects of the present disclosure. The device 505 may be an example of aspects of a UE 115 as described herein. The device 505 may include a receiver 510, a communications manager 515, and a transmitter 520. The device 505 may also include one or more processors, memory coupled with the one or more processors, and instructions stored in the memory that are executable by the one or more processors to enable the one or more processors to perform the features discussed herein. Each of these components may be in communication with one another (e.g., via one or more buses).

The receiver 510 may receive information such as packets, user data, or control information associated with various information channels (e.g., control channels, data channels, and information related to association of TCI states to PCIs, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may: receive, using one or more receive beams associated with a TCI state, a downlink transmission from a set of TRPs identified by a set of PCIs; identify, based on the TCI state and an association between the set of PCIs and a set of TCI states, a first PCI of the set of PCIs to use to decode the received downlink transmission; and decode the received downlink transmission using the identified first PCI.

The communications manager 515 as described herein may be implemented to realize one or more potential advantages. For example, using the association to identify the first PCI may allow the device 505 may decode a transmission that the device 505 would otherwise be unable to decode. Thus, the device 505 may increase system efficiency by preventing re-transmission of the data conveyed by the downlink transmission. The device 505 may also conserve power by powering down components that would otherwise be activated to receive the re-transmission of the data. Further, avoiding the re-transmission of the data may also ease the processing burden of the device 505.

The communications manager 515 may also identify an association between a set of reference signals for radio link management and a set of PCIs, the set of PCIs identifying a set of TRPs; receive a first reference signal from a first TRP of the set of TRPs and a second reference signal from a second TRP of the set of TRPs; identify, based on the received first reference signal, the received second reference signal, and the identified association between the set of PCIs and the set of reference signals for radio link management, a PCI of the set of PCIs to use to decode a downlink transmission received from at least one of the first TRP and the second TRP; and decode the received downlink transmission using the identified PCI. By using the association to identify the PCI, the device 505 may monitor and decode signals (e.g., SSB/SCI-RS) from a TRP other than the anchor TRP, which may allow the device 505 to maintain a connection when the anchor TRP fails. For example, when the anchor TRP fails the device 505 may switch connections to a second TRP rather than performing reconnection procedures with the anchor TRP. Thus, receiving the association may allow device 505 may reduce latency and signaling overhead by avoiding performing a reconnection procedure. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
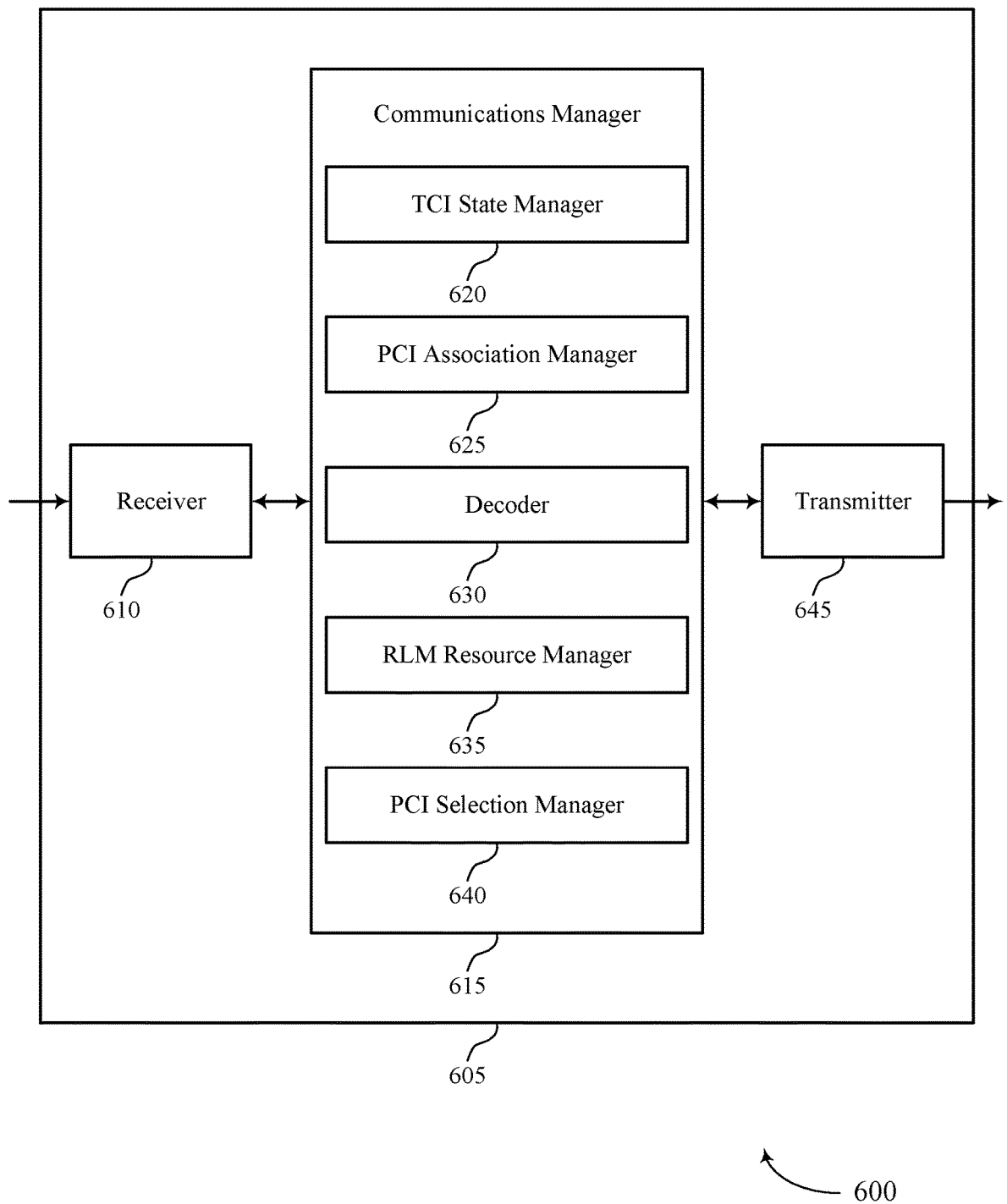

FIG. 6 shows a block diagram 600 of a device 605 that supports association of TCI states to PCIs in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to association of TCI states to PCIs, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a TCI state manager 620, a PCI association manager 625, a decoder 630, an RLM resource manager 635, and a PCI selection manager 640. One or more processors may implement some or all of the operations of the TCI state manager 620, the PCI association manager 625, the decoder 630, the RLM resource manager 635, and the PCI selection manager 640. The processor(s) may be coupled with memory and execute instructions stored in the memory that enable the processor(s) to perform or facilitate the association features discussed herein. The communications manager 615 may be an example of aspects of the communications manager 810 described herein.

The TCI state manager 620 may receive, using a receive beam associated with a TCI state, a downlink transmission from a set of TRPs identified by a set of PCIs. The PCI association manager 625 may identify, based on the TCI state and an association between the set of PCIs and a set of TCI states, a first PCI of the set of PCIs to use to decode the received downlink transmission. The decoder 630 may decode the received downlink transmission using the identified first PCI.

The PCI association manager 625 may identify an association between a set of reference signals for radio link management and a set of PCIs, the set of PCIs identifying a set of TRPs. The RLM resource manager 635 may receive a first reference signal from a first TRP of the set of TRPs and a second reference signal from a second TRP of the set of TRPs. The PCI selection manager 640 may identify, based on the received first reference signal, the received second reference signal, and the identified association between the set of PCIs and the set of reference signals for radio link management, a PCI of the set of PCIs to use to decode a downlink transmission received from at least one of the first TRP and the second TRP. The decoder 630 may decode the received downlink transmission using the identified PCI.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
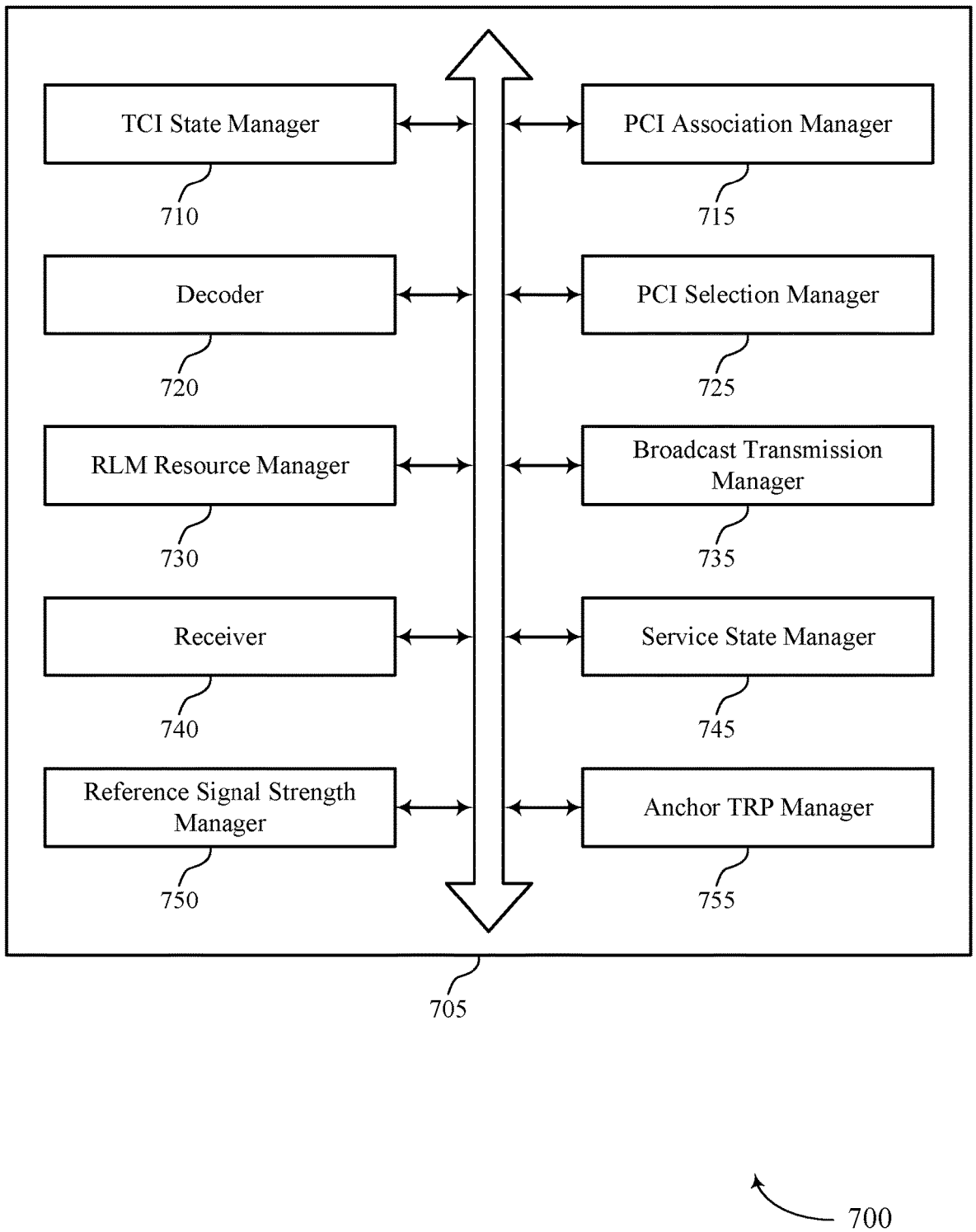
FIG. 7 shows a block diagram of a communications manager that supports association of TCI states to PCIs in accordance with aspects of the present disclosure.

FIG. 7 shows a block diagram 700 of a communications manager 705 that supports association of TCI states to PCIs in accordance with aspects of the present disclosure. The communications manager 705 may be an example of aspects of a communications manager 515, a communications manager 615, or a communications manager 810 described herein. The communications manager 705 may include a TCI state manager 710, a PCI association manager 715, a decoder 720, a PCI selection manager 725, an RLM resource manager 730, a broadcast transmission manager 735, a receiver 740, a service state manager 745, a reference signal strength manager 750, and an anchor TRP manager 755. Each of these modules may communicate, directly or indirectly, with one another (e.g., via one or more buses). One or more processors may implement some or all of the operations of the TCI state manager 710, the PCI association manager 715, the decoder 720, the PCI selection manager 725, the RLM resource manager 730, the broadcast transmission manager 735, the service state manager 745, the reference signal strength manager 750, and the anchor TRP manager 755. The processor(s) may be coupled with memory and execute instructions stored in the memory that enable the processor(s) to perform or facilitate the association features discussed herein.

The TCI state manager 710 may receive, using a receive beam associated with a TCI state, a downlink transmission from a set of TRPs identified by a set of PCIs. In some examples, the TCI state manager 710 may receive, using a receive beam associated with a second TCI state, a second downlink transmission for the first TRP and the second TRP.

The PCI association manager 715 may identify, based on the TCI state and an association between the set of PCIs and a set of TCI states, a first PCI of the set of PCIs to use to decode the received downlink transmission. In some examples, the PCI association manager 715 may identify an association between a set of reference signals for radio link management and a set of PCIs, the set of PCIs identifying a set of TRPs. In some examples, the PCI association manager 715 may receive an indication of the association between the set of PCIs and the TCI state. In some examples, the PCI association manager 715 may identify that the TCI state lacks an associated PCI. In some examples, the PCI association manager 715 may receive an indication of the association between the set of reference signals for radio link management and the set of PCIs, where the association is identified based on the received indication.

The decoder 720 may decode the received downlink transmission using the identified first PCI. In some examples, the decoder 720 may decode the received downlink transmission using the identified PCI. In some examples, the decoder 720 may decode the received second downlink transmission using a default PCI.

The PCI selection manager 725 may identify, based on the received first reference signal, the received second reference signal, and the identified association between the set of PCIs and the set of reference signals for radio link management, a PCI of the set of PCIs to use to decode a downlink transmission received from at least one of the first TRP and the second TRP. In some examples, the PCI selection manager 725 may receive an SSB during an initial access procedure of the UE, and determine a PCI based at least in part on the received SSB, where the first PCI of the plurality of PCIs to use to decode the received downlink transmission includes the determined PCI. In some examples, the PCI selection manager 725 may determine that the first PCI has a smaller value than the second PCI, where the first PCI is identified based on the determination. In some examples, the PCI selection manager 725 may identify the PCI as a default PCI of the set of PCIs, where the received first reference signal, or the received signal second reference signal, or both, are associated with a set of PCIs. In some examples, determining that one of the first PCI or the second PCI has a smaller value than an other of the first PCI or the second PCI, where the default PCI includes the one of the first PCI or the second PCI having the smaller value. In some cases, the TCI state is associated with at least the first PCI and a second PCI of the set of PCIs. In some cases, the default PCI includes a PCI determined from an SSB during an initial access procedure of the UE.

In some cases, identifying the PCI as the default PCI includes identifying that one of the first TRP or the second TRP has RLM resources configured for the UE, where the default PCI includes a PCI identifying the one of the first TRP or the second TRP that has RLM resources configured for the UE.

The RLM resource manager 730 may receive a first reference signal from a first TRP of the set of TRPs and a second reference signal from a second TRP of the set of TRPs. In some examples, the RLM resource manager 730 may identify that one of the first TRP or the second TRP has RLM resources configured for the UE, where the received downlink transmission is decoded using the first PCI identifying the first TRP or the first PCI identifying the second TRP according to the one of the first TRP or the second TRP having the RLM resources configured. In some cases, at least one of the received first reference signal and the received second reference signal include a synchronization signal block and channel state information reference signal.

The broadcast transmission manager 735 may identify a configuration of the UE to receive broadcast transmissions from one of the first TRP or the second TRP, where the received downlink transmission is decoded using the first PCI identifying the first TRP or the first PCI identifying the second TRP according to the identified configuration. In some examples, identifying a configuration of the UE to receive broadcast transmissions from one of the first TRP or the second TRP, where the default PCI includes a PCI identifying the one of the first TRP or the second TRP.

The receiver 740 may monitor for the downlink transmission in a common search space. In some cases, the downlink transmission includes a downlink control channel signal in the common search space or downlink data channel signal in the common search space.

The service state manager 745 may transmit a report of service states for at least one of the set of TRPs, the service states including an in service state or an out of service state.

The reference signal strength manager 750 may determine that a signal strength of the received first reference signal greater than a signal strength of the received second reference signal, where the PCI is identified to use to decode the downlink transmission based on the determination, and the PCI identifies the first TRP. In some examples, the reference signal strength manager 750 may determine that a signal strength of the received first reference signal is less than a predetermined signal strength threshold. In some examples, the reference signal strength manager 750 may determine that a signal strength of the received first reference signal is greater than a predetermined signal strength threshold.

The anchor TRP manager 755 may determine to switch an anchor TRP from the first TRP to the second TRP. In some examples, the anchor TRP manager 755 may determine to switch an anchor TRP from the second TRP to the first TRP.

Figure 8:
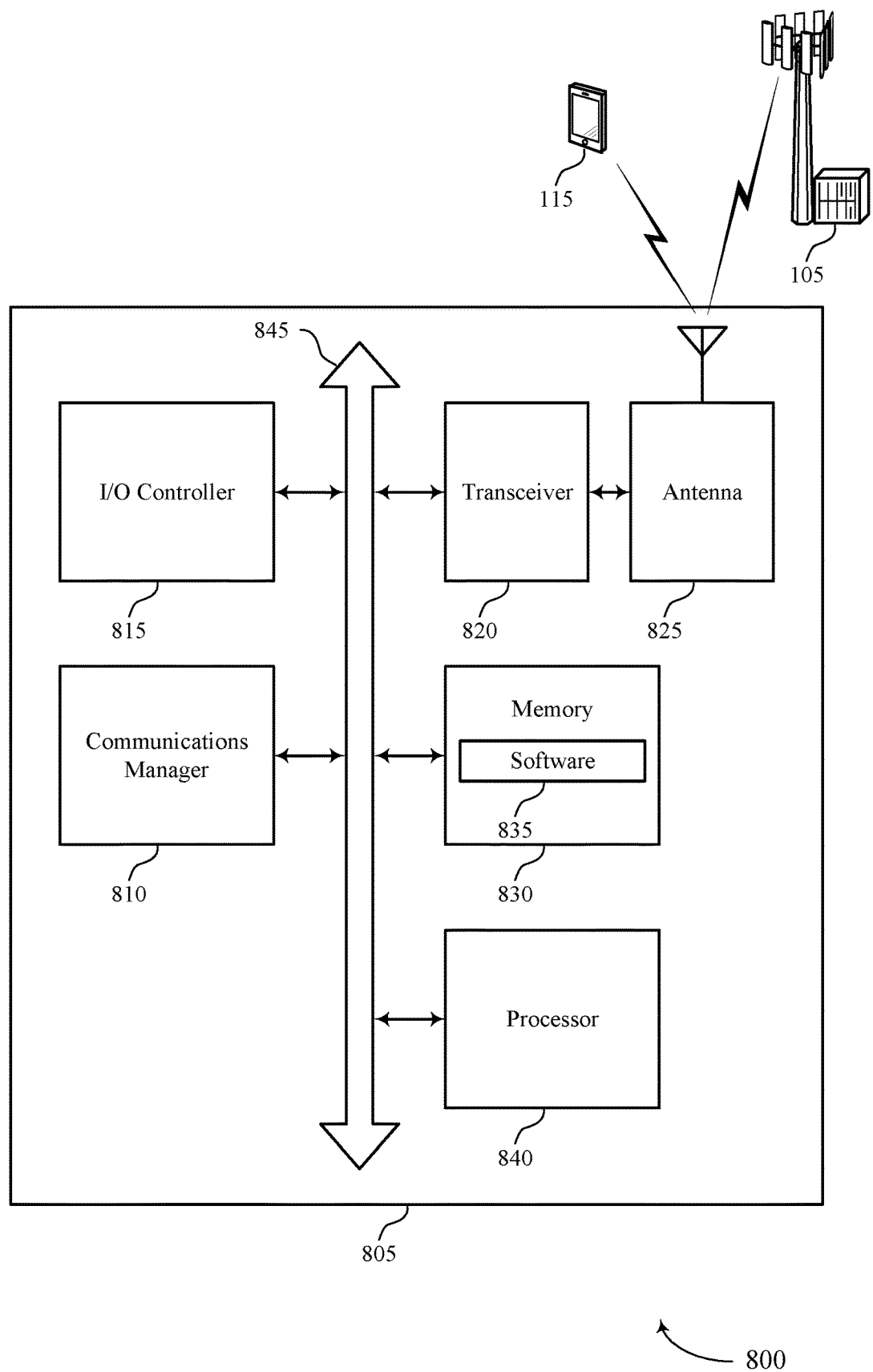
FIG. 8 shows a diagram of a system including a device that supports association of TCI states to PCIs in accordance with aspects of the present disclosure.

FIG. 8 shows a diagram of a system 800 including a device 805 that supports association of TCI states to PCIs in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, using a receive beam associated with a TCI state, a downlink transmission from a set of TRPs identified by a set of PCIs, identify, based on the TCI state and an association between the set of PCIs and a set of TCI states, a first PCI of the set of PCIs to use to decode the received downlink transmission, and decode the received downlink transmission using the identified first PCI. The communications manager 810 may also identify an association between a set of reference signals for radio link management and a set of PCIs, the set of PCIs identifying a set of TRPs, receive a first reference signal from a first TRP of the set of TRPs and a second reference signal from a second TRP of the set of TRPs, identify, based on the received first reference signal, the received second reference signal, and the identified association between the set of PCIs and the set of reference signals for radio link management, a PCI of the set of PCIs to use to decode a downlink transmission received from at least one of the first TRP and the second TRP, and decode the received downlink transmission using the identified PCI.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code or software 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting association of TCI states to PCIs).

The software 835 may include instructions to implement aspects of the present disclosure, including instructions to support wireless communications. The software 835 may be stored in a non-transitory computer-readable medium such as system memory or other type of memory. In some cases, the software 835 may not be directly executable by the processor 840 but may cause a computer (e.g., when compiled and executed) to perform functions described herein.

Figure 9:
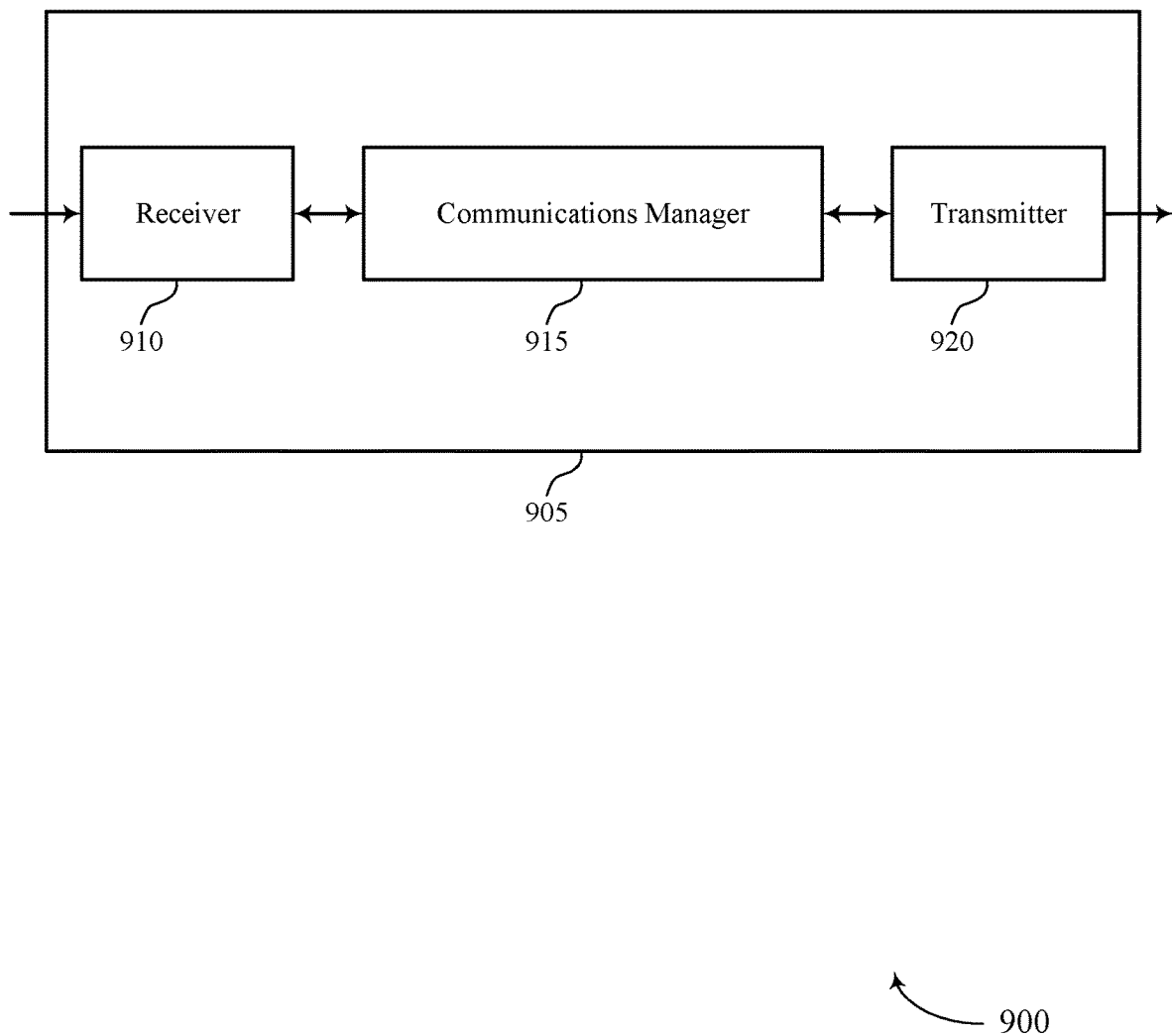
FIGS. 9 and 10 show block diagrams of devices that support association of TCI states to PCIs in accordance with aspects of the present disclosure.

FIG. 9 shows a block diagram 900 of a device 905 that supports association of TCI states to PCIs in accordance with aspects of the present disclosure. The device 905 may be an example of aspects of a base station 105 as described herein. The device 905 may include a receiver 910, a communications manager 915, and a transmitter 920. The device 905 may also include one or more processors, memory coupled with the one or more processors, and instructions stored in the memory that are executable by the one or more processors to enable the one or more processors to perform the features discussed herein. Each of these components may be in communication with one another (e.g., via one or more buses).

The receiver 910 may receive information such as packets, user data, or control information associated with various information channels (e.g., control channels, data channels, and information related to association of TCI states to PCIs, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may: identify an association between a set of PCIs and a set of TCI states for a UE, the set of PCIs identifying a set of TRPs; transmit, to the UE, an indication of the identified association; and transmit, to the UE based at least in part on transmitting the indication of the identified association, a downlink transmission encoded according to a first PCI or a second PCI based at least in part on the identified association.

The communications manager 915 as described herein may be implemented to realize one or more potential advantages. For example, by providing the identified association to the UE, device 905 may enable the UE to decode the subsequent downlink transmission without re-transmission or additional signaling. Thus, device 905 may reduce latency and conserve system resources, including system resources (e.g., radio resources) and resources at device 905 and the UE (e.g., power and processing resources).

The communications manager 915 may also identify, for a UE, an association between a set of reference signals for radio link management and a set of PCIs, the set of PCIs identifying a set of TRPs and transmit, to the UE, an indication of the identified association. Providing the association to the UE may enable the device 505 to monitor connection signals from other TRPs so that the UE can switch connections when its anchor TRP fails. Switching connections may allow the UE to avoid performing RLF procedures, which may be associated with latency arising from RACH procedures or connection reestablishment procedures. Thus, providing the association to the UE may prevent interruption in communications and conserve processing resources at the UE (e.g., because the UE can avoid the processing overhead associated with re-establishing a connection with device 905). The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
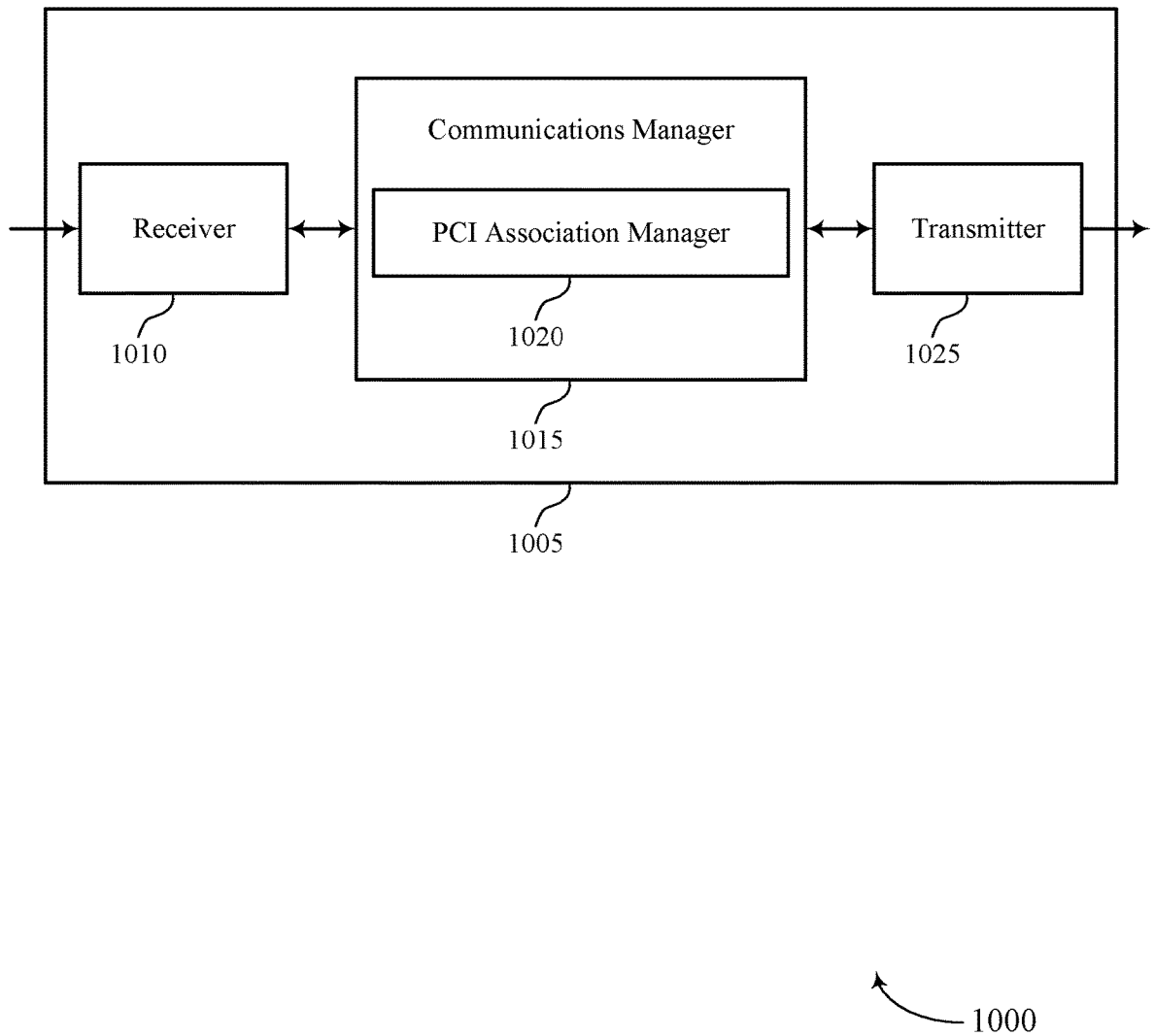

FIG. 10 shows a block diagram 1000 of a device 1005 that supports association of TCI states to PCIs in accordance with aspects of the present disclosure. The device 1005 may be an example of aspects of a device 905, or a base station 105 as described herein. The device 1005 may include a receiver 1010, a communications manager 1015, and a transmitter 1025. The device 1005 may also include a processor. Each of these components may be in communication with one another (e.g., via one or more buses).

The receiver 1010 may receive information such as packets, user data, or control information associated with various information channels (e.g., control channels, data channels, and information related to association of TCI states to PCIs, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a PCI association manager 1020. The communications manager 1015 may be an example of aspects of the communications manager 1210 described herein.

The PCI association manager 1020 may identify an association between a set of PCIs and a set of TCI states for a UE, the set of PCIs identifying a set of TRPs and transmit, to the UE, an indication of the identified association. The PCI association manager 1020 may identify, for a UE, an association between a set of reference signals for radio link management and a set of PCIs, the set of PCIs identifying a set of TRPs and transmit, to the UE, an indication of the identified association. A processor may implement some or all of the operations of the PCI association manager 1020. The processor may be coupled with memory and execute instructions stored in the memory that enable the processor to perform or facilitate the association features discussed herein.

The transmitter 1025 may transmit signals generated by other components of the device 1005. In some examples, the transmitter 1025 may be collocated with a receiver 1010 in a transceiver module. For example, the transmitter 1025 may be an example of aspects of the transceiver 1220 described with reference to FIG. 12. The transmitter 1025 may utilize a single antenna or a set of antennas.

Figure 11:
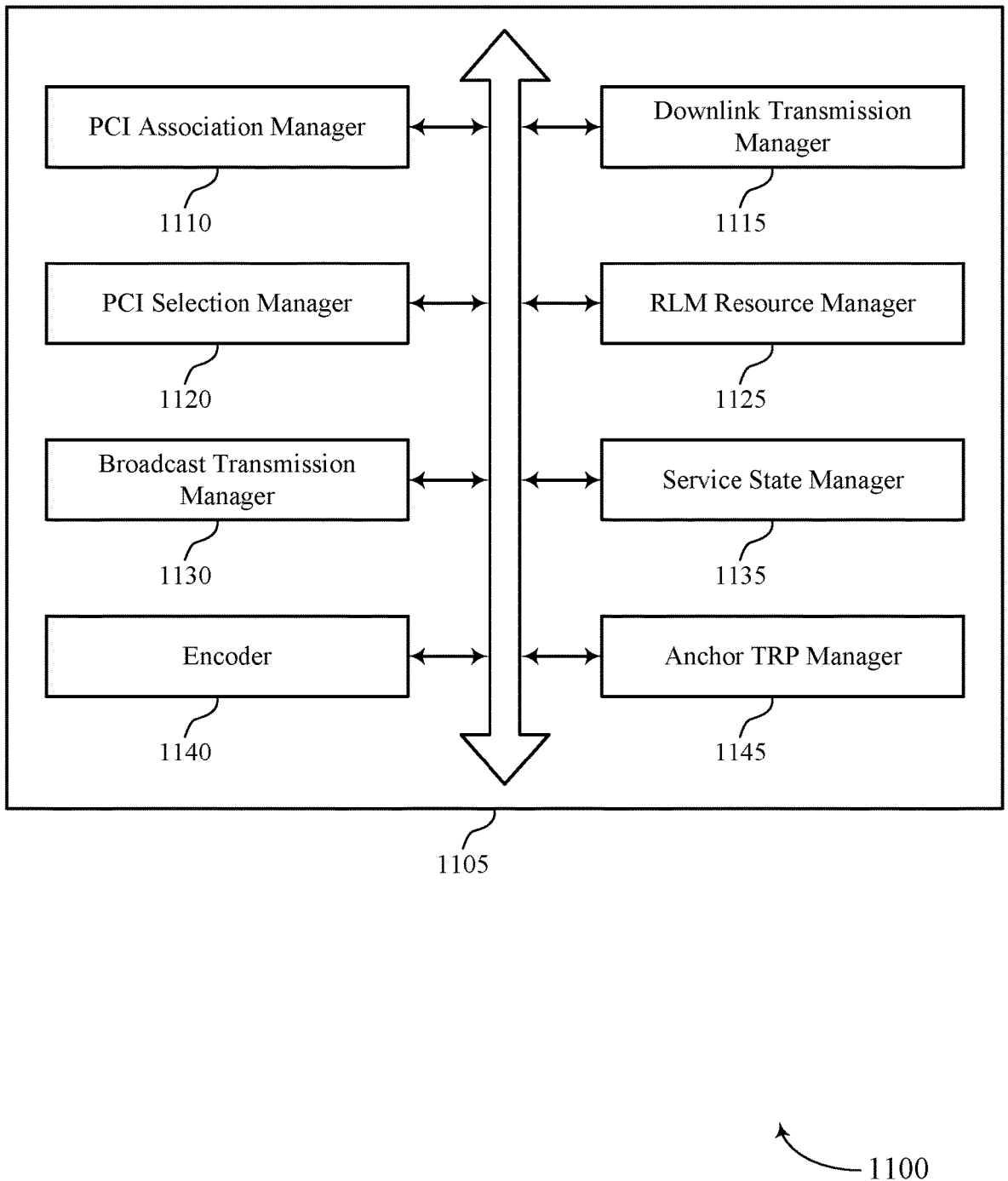
FIG. 11 shows a block diagram of a communications manager that supports association of TCI states to PCIs in accordance with aspects of the present disclosure.

FIG. 11 shows a block diagram 1100 of a communications manager 1105 that supports association of TCI states to PCIs in accordance with aspects of the present disclosure. The communications manager 1105 may be an example of aspects of a communications manager 915, a communications manager 1015, or a communications manager 1210 described herein. The communications manager 1105 may include a PCI association manager 1110, a downlink transmission manager 1115, a PCI selection manager 1120, an RLM resource manager 1125, a broadcast transmission manager 1130, a service state manager 1135, an encoder 1140, and an anchor TRP manager 1145. Each of these modules may communicate, directly or indirectly, with one another (e.g., via one or more buses).

The PCI association manager 1110 may identify an association between a set of PCIs and a set of TCI states for a UE, the set of PCIs identifying a set of TRPs. In some examples, the PCI association manager 1110 may transmit, to the UE, an indication of the identified association. In some examples, the PCI association manager 1110 may identify, for a UE, an association between a set of reference signals for radio link management and a set of PCIs, the set of PCIs identifying a set of TRPs. In some examples, the PCI association manager 1110 may transmit, to the UE, an indication of the identified association. In some cases, at least one of the set of reference signals includes a synchronization signal block and channel state information reference signal. A processor may implement some or all of the operations of the PCI association manager 1110. The processor may be coupled with memory and execute instructions stored in the memory that enable the processor to perform or facilitate the association features discussed herein.

The downlink transmission manager 1115 may transmit, to the UE based on transmitting the indication of the identified association, a downlink transmission encoded according to a first PCI or a second PCI based on the identified association. In some examples, the downlink transmission manager 1115 may transmit the encoded downlink transmission. A processor may implement some or all of the operations of the downlink transmission manager 1115. The processor may be coupled with memory and execute instructions stored in the memory that enable the processor to perform or facilitate the association features discussed herein.

The PCI selection manager 1120 may identify a first PCI of the plurality of PCIs used to encode a synchronization signal block (SSB) for the UE during initial access for the UE, where the downlink transmission is encoded using the first PCI based at least in part on the identification. In some examples, the PCI selection manager 1120 may determine that the first PCI or the second PCI has a smaller value than an other of the first PCI or the second PCI, where the downlink transmission is encoded using the first PCI or the second PCI having the smaller value. In some examples, the PCI selection manager 1120 may identify, based on the identified association, a PCI of the set of PCIs to use to encode a downlink transmission to the UE. A processor may implement some or all of the operations of the PCI selection manager 1120. The processor may be coupled with memory and execute instructions stored in the memory that enable the processor to perform or facilitate the association features discussed herein.

The RLM resource manager 1125 may identify that one of a first TRP of the set of TRPs or a second TRP of the set of TRPs has RLM resources configured for the UE, where the downlink transmission is encoded using the first PCI identifying the first TRP or the second PCI identifying the second TRP according to the one of the first TRP or the second TRP having the RLM resources configured. A processor may implement some or all of the operations of the RLM resource manager 1125. The processor may be coupled with memory and execute instructions stored in the memory that enable the processor to perform or facilitate the association features discussed herein.

The broadcast transmission manager 1130 may identify a configuration of the UE to receive broadcast transmissions from one of a first TRP of the set of TRPs or a second TRP of the set of TRPs, where the downlink transmission is encoded using the first PCI identifying the first TRP or the first PCI identifying the second TRP according to the identified configuration. A processor may implement some or all of the operations of the broadcast transmission manager 1130. The processor may be coupled with memory and execute instructions stored in the memory that enable the processor to perform or facilitate the association features discussed herein.

The service state manager 1135 may receive, from the UE, a report of service states for at least one of the set of TRPs, the service states including an in service state or an out of service state. A processor may implement some or all of the operations of the service state manager 1135. The processor may be coupled with memory and execute instructions stored in the memory that enable the processor to perform or facilitate the association features discussed herein.

The encoder 1140 may encode the downlink transmission using the identified PCI. A processor may implement some or all of the operations of the encoder 1140. The processor may be coupled with memory and execute instructions stored in the memory that enable the processor(s) to perform or facilitate the association features discussed herein.

The anchor TRP manager 1145 may receive, from the UE, a request to switch an anchor TRP from a first TRP of the set of TRPs to a second TRP of the set of TRPs. A processor may implement some or all of the operations of the anchor TRP manager 1145. The processor may be coupled with memory and execute instructions stored in the memory that enable the processor to perform or facilitate the association features discussed herein.

Figure 12:
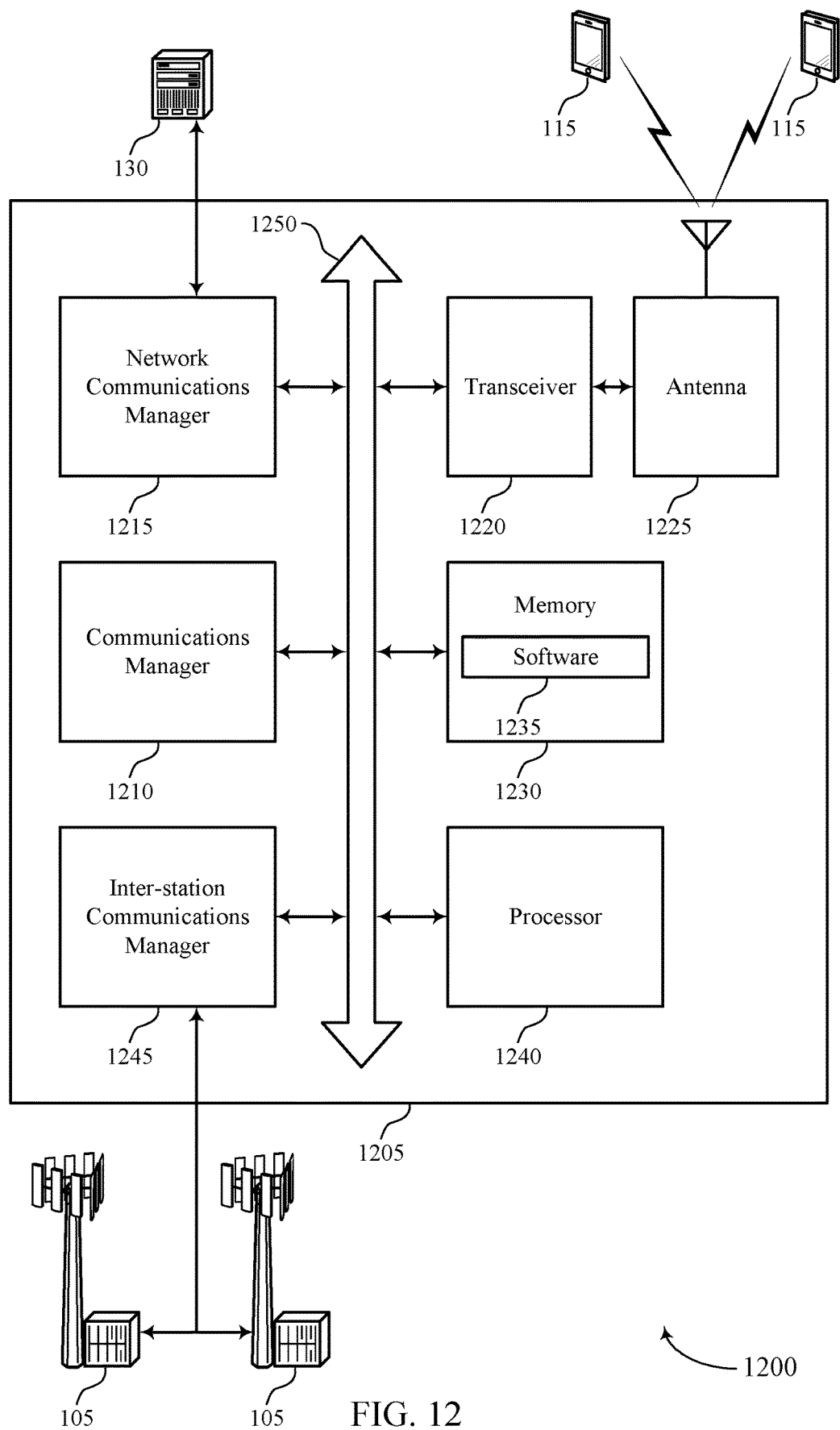
FIG. 12 shows a diagram of a system including a device that supports association of TCI states to PCIs in accordance with aspects of the present disclosure.

FIG. 12 shows a diagram of a system 1200 including a device 1205 that supports association of TCI states to PCIs in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify an association between a set of PCIs and a set of TCI states for a UE, the set of PCIs identifying a set of TRPs and transmit, to the UE, an indication of the identified association. The communications manager 1210 may also identify, for a UE, an association between a set of reference signals for radio link management and a set of PCIs, the set of PCIs identifying a set of TRPs and transmit, to the UE, an indication of the identified association.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code or software 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting association of TCI states to PCIs).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The software 1235 may include instructions to implement aspects of the present disclosure, including instructions to support wireless communications. The software 1235 may be stored in a non-transitory computer-readable medium such as system memory or other type of memory. In some cases, the software 1235 may not be directly executable by the processor 1240 but may cause a computer (e.g., when compiled and executed) to perform functions described herein.

Figure 13:
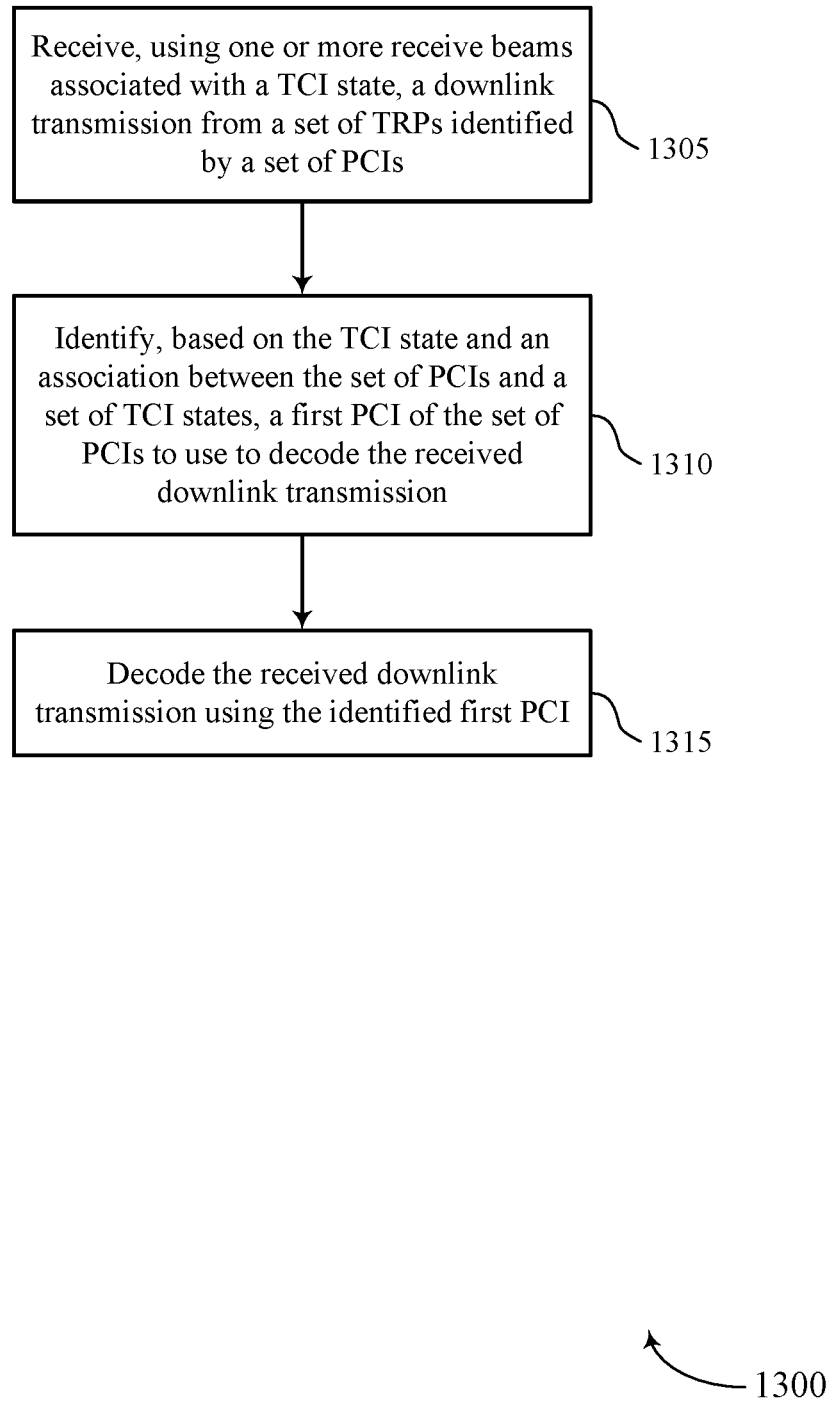
FIGS. 13 through 18 show flowcharts illustrating methods that support association of TCI states to PCIs in accordance with aspects of the present disclosure.

FIG. 13 shows a flowchart illustrating a method 1300 that supports association of TCI states to PCIs in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive, using one or more receive beams associated with a TCI state, a downlink transmission from a set of TRPs identified by a set of PCIs. The operations of 1305 may be performed according to the methods described herein. In some examples, aspects of the operations of 1305 may be performed by a TCI state manager as described with reference to FIGS. 5 through 8.

At 1310, the UE may identify, based on the TCI state and an association between the set of PCIs and a set of TCI states, a first PCI of the set of PCIs to use to decode the received downlink transmission. The operations of 1310 may be performed according to the methods described herein. In some examples, aspects of the operations of 1310 may be performed by a PCI association manager as described with reference to FIGS. 5 through 8.

At 1315, the UE may decode the received downlink transmission using the identified first PCI. The operations of 1315 may be performed according to the methods described herein. In some examples, aspects of the operations of 1315 may be performed by a decoder as described with reference to FIGS. 5 through 8.

Figure 14:
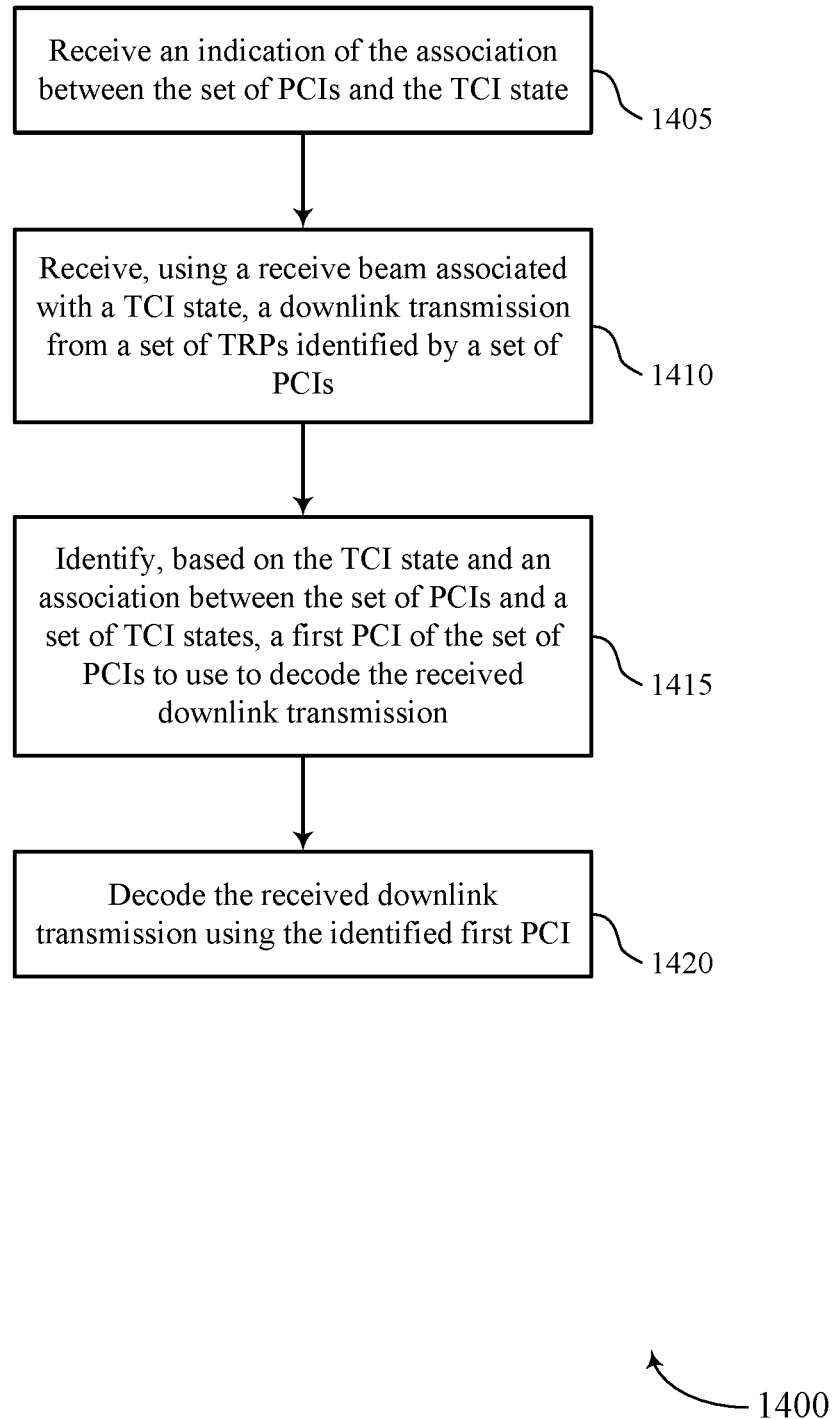

FIG. 14 shows a flowchart illustrating a method 1400 that supports association of TCI states to PCIs in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive an indication of the association between the set of PCIs and the TCI state. The operations of 1405 may be performed according to the methods described herein. In some examples, aspects of the operations of 1405 may be performed by a PCI association manager as described with reference to FIGS. 5 through 8.

At 1410, the UE may receive, using a receive beam associated with a TCI state, a downlink transmission from a set of TRPs identified by a set of PCIs. The operations of 1410 may be performed according to the methods described herein. In some examples, aspects of the operations of 1410 may be performed by a TCI state manager as described with reference to FIGS. 5 through 8.

At 1415, the UE may identify, based on the TCI state and an association between the set of PCIs and a set of TCI states, a first PCI of the set of PCIs to use to decode the received downlink transmission. The operations of 1415 may be performed according to the methods described herein. In some examples, aspects of the operations of 1415 may be performed by a PCI association manager as described with reference to FIGS. 5 through 8.

At 1420, the UE may decode the received downlink transmission using the identified first PCI. The operations of 1420 may be performed according to the methods described herein. In some examples, aspects of the operations of 1420 may be performed by a decoder as described with reference to FIGS. 5 through 8.

Figure 15:
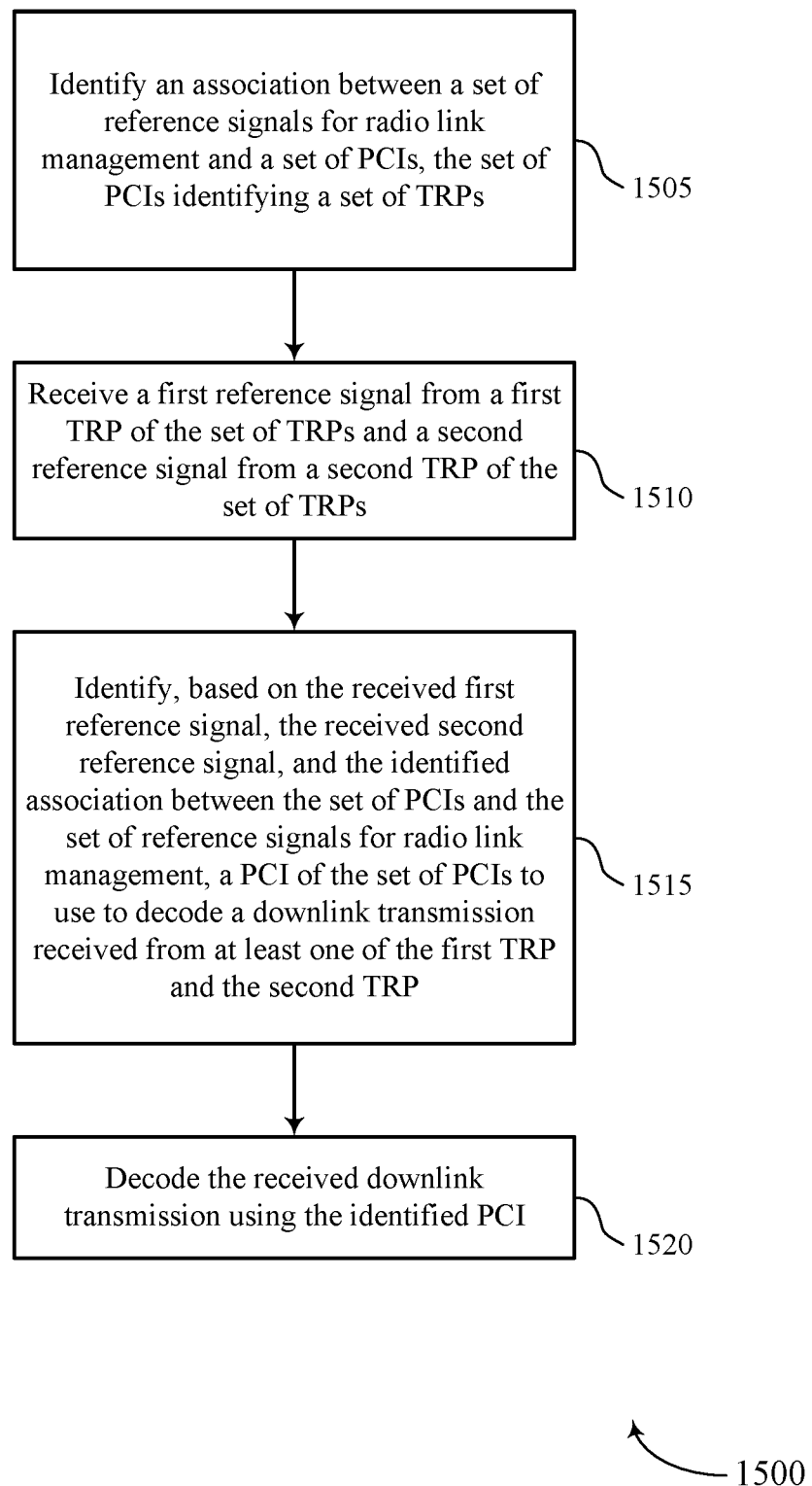

FIG. 15 shows a flowchart illustrating a method 1500 that supports association of TCI states to PCIs in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may identify an association between a set of reference signals for radio link management and a set of PCIs, the set of PCIs identifying a set of TRPs. The operations of 1505 may be performed according to the methods described herein. In some examples, aspects of the operations of 1505 may be performed by a PCI association manager as described with reference to FIGS. 5 through 8.

At 1510, the UE may receive a first reference signal from a first TRP of the set of TRPs and a second reference signal from a second TRP of the set of TRPs. The operations of 1510 may be performed according to the methods described herein. In some examples, aspects of the operations of 1510 may be performed by an RLM resource manager as described with reference to FIGS. 5 through 8.

At 1515, the UE may identify, based on the received first reference signal, the received second reference signal, and the identified association between the set of PCIs and the set of reference signals for radio link management, a PCI of the set of PCIs to use to decode a downlink transmission received from at least one of the first TRP and the second TRP. The operations of 1515 may be performed according to the methods described herein. In some examples, aspects of the operations of 1515 may be performed by a PCI selection manager as described with reference to FIGS. 5 through 8.

At 1520, the UE may decode the received downlink transmission using the identified PCI. The operations of 1520 may be performed according to the methods described herein. In some examples, aspects of the operations of 1520 may be performed by a decoder as described with reference to FIGS. 5 through 8.

Figure 16:
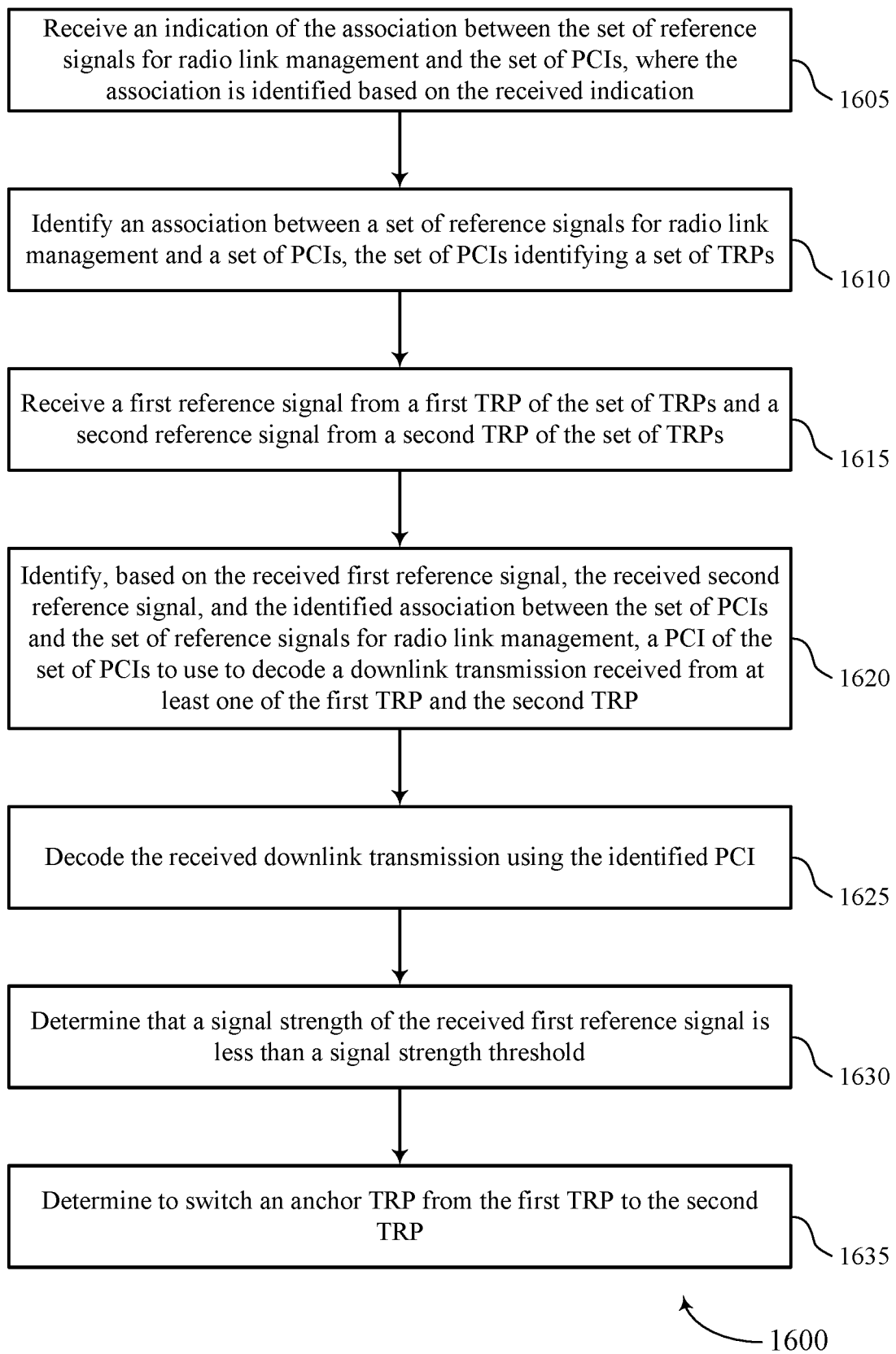

FIG. 16 shows a flowchart illustrating a method 1600 that supports association of TCI states to PCIs in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE may receive an indication of the association between the set of reference signals for radio link management and the set of PCIs, where the association is identified based on the received indication. The operations of 1605 may be performed according to the methods described herein. In some examples, aspects of the operations of 1605 may be performed by a PCI association manager as described with reference to FIGS. 5 through 8.

At 1610, the UE may identify an association between a set of reference signals for radio link management and a set of PCIs, the set of PCIs identifying a set of TRPs. The operations of 1610 may be performed according to the methods described herein. In some examples, aspects of the operations of 1610 may be performed by a PCI association manager as described with reference to FIGS. 5 through 8.

At 1615, the UE may receive a first reference signal from a first TRP of the set of TRPs and a second reference signal from a second TRP of the set of TRPs. The operations of 1615 may be performed according to the methods described herein. In some examples, aspects of the operations of 1615 may be performed by an RLM resource manager as described with reference to FIGS. 5 through 8.

At 1620, the UE may identify, based on the received first reference signal, the received second reference signal, and the identified association between the set of PCIs and the set of reference signals for radio link management, a PCI of the set of PCIs to use to decode a downlink transmission received from at least one of the first TRP and the second TRP. The operations of 1620 may be performed according to the methods described herein. In some examples, aspects of the operations of 1620 may be performed by a PCI selection manager as described with reference to FIGS. 5 through 8.

At 1625, the UE may decode the received downlink transmission using the identified PCI. The operations of 1625 may be performed according to the methods described herein. In some examples, aspects of the operations of 1625 may be performed by a decoder as described with reference to FIGS. 5 through 8.

At 1630, the UE may determine that a signal strength of the received first reference signal is less than a predetermined signal strength threshold. The operations of 1630 may be performed according to the methods described herein. In some examples, aspects of the operations of 1630 may be performed by a reference signal strength manager as described with reference to FIGS. 5 through 8.

At 1635, the UE may determine to switch an anchor TRP from the first TRP to the second TRP. The operations of 1635 may be performed according to the methods described herein. In some examples, aspects of the operations of 1635 may be performed by an anchor TRP manager as described with reference to FIGS. 5 through 8.

Figure 17:
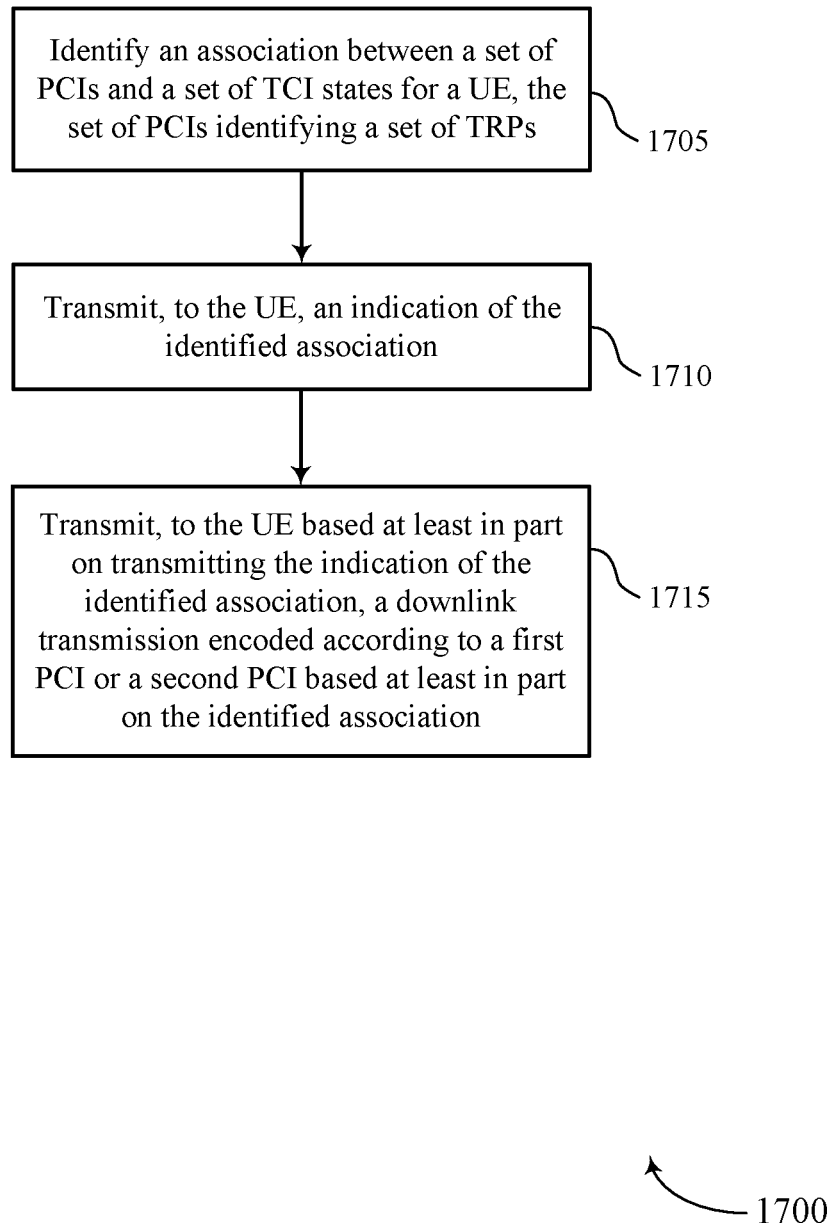

FIG. 17 shows a flowchart illustrating a method 1700 that supports association of TCI states to PCIs in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1705, the base station may identify an association between a set of PCIs and a set of TCI states for a UE, the set of PCIs identifying a set of TRPs. The operations of 1705 may be performed according to the methods described herein. In some examples, aspects of the operations of 1705 may be performed by a PCI association manager as described with reference to FIGS. 9 through 12.

At 1710, the base station may transmit, to the UE, an indication of the identified association. The operations of 1710 may be performed according to the methods described herein. In some examples, aspects of the operations of 1710 may be performed by a PCI association manager as described with reference to FIGS. 9 through 12.

At 1715, the base station may transmit, to the UE based at least in part on transmitting the indication of the identified association, a downlink transmission encoded according to a first PCI or a second PCI based at least in part on the identified association. The operations of 1715 may be performed according to the methods described herein. In some examples, aspects of the operations of 1715 may be performed by a downlink transmission manager as described with reference to FIG. 11.

Figure 18:
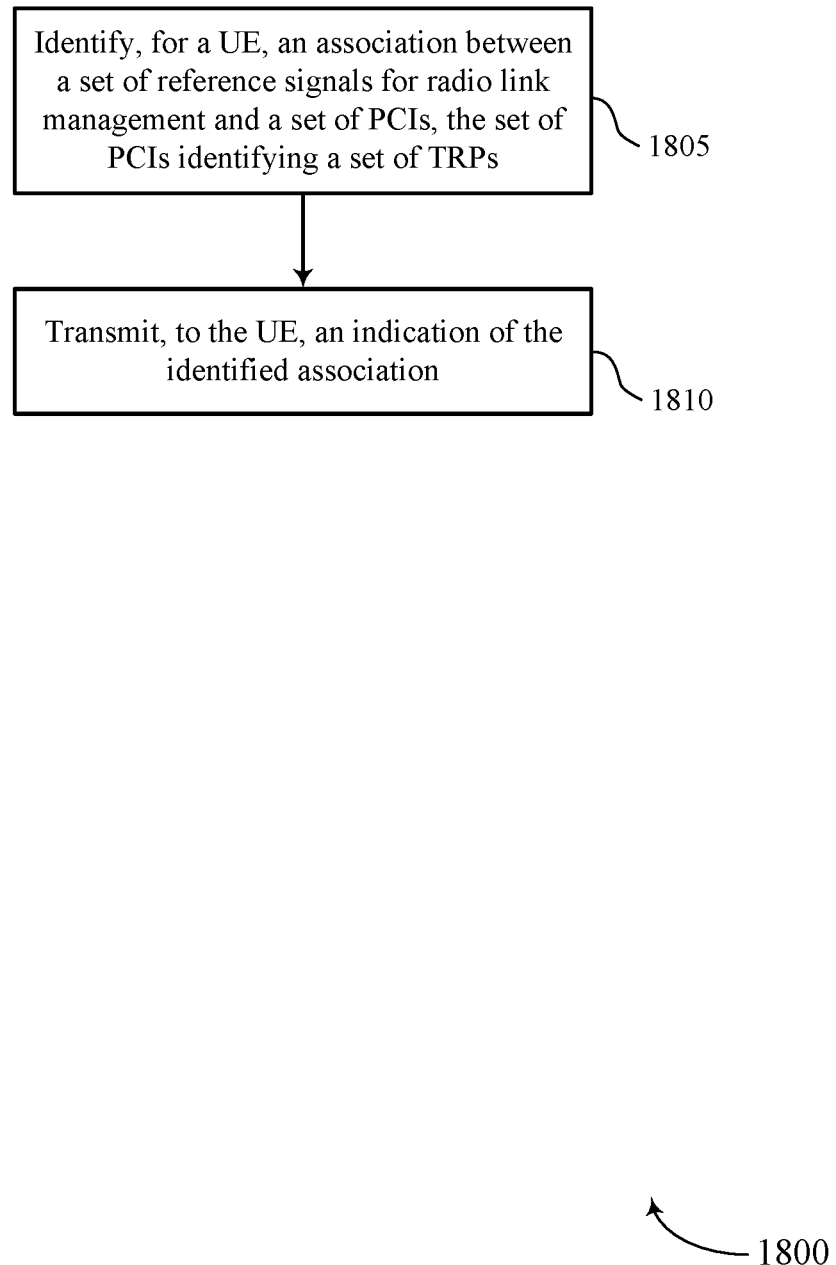

FIG. 18 shows a flowchart illustrating a method 1800 that supports association of TCI states to PCIs in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described herein.

Additionally or alternatively, a base station may perform aspects of the functions described herein using special-purpose hardware.

At 1805, the base station may identify, for a UE, an association between a set of reference signals for radio link management and a set of PCIs, the set of PCIs identifying a set of TRPs. The operations of 1805 may be performed according to the methods described herein. In some examples, aspects of the operations of 1805 may be performed by a PCI association manager as described with reference to FIGS. 9 through 12.

At 1810, the base station may transmit, to the UE, an indication of the identified association. The operations of 1810 may be performed according to the methods described herein. In some examples, aspects of the operations of 1810 may be performed by a PCI association manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication as a user equipment (UE), comprising:
   receiving, using one or more receive beams associated with a transmission configuration indicator (TCI) state, a downlink transmission from a plurality of transmission reception points (TRPs) identified by a plurality of physical cell identifiers (PCIs);
   identifying, based at least in part on the TCI state and an association between the plurality of PCIs and a plurality of TCI states, a first PCI of the plurality of PCIs to use to process the received downlink transmission; and
   processing the received downlink transmission using the identified first PCI.

2. The method of claim 1, further comprising:
   receiving an indication of the association between the plurality of PCIs and the TCI state.

3. The method of claim 1, wherein the TCI state is associated with at least the first PCI and a second PCI of the plurality of PCIs.

4. The method of claim 3, further comprising:
   receiving a synchronization signal block (SSB) during an initial access procedure of the UE; and
   determining a PCI based at least in part on the received SSB, wherein the first PCI of the plurality of PCIs to use to decode the received downlink transmission comprises the determined PCI.

5. The method of claim 3, further comprising:
   identifying that one of a first TRP or a second TRP has radio link management (RLM) resources configured for the UE, wherein the received downlink transmission is decoded using the first PCI identifying the first TRP or the first PCI identifying the second TRP according to the one of the first TRP or the second TRP having the RLM resources configured.

6. The method of claim 3, further comprising:
   identifying a configuration of the UE to receive broadcast transmissions from one of a first TRP or a second TRP, wherein the received downlink transmission is decoded using the first PCI identifying the first TRP or the first PCI identifying the second TRP according to the identified configuration.

7. The method of claim 3, further comprising:
   determining that the first PCI has a smaller value than the second PCI, wherein the first PCI is identified based at least in part on the determination.

8. The method of claim 1, further comprising:
   receiving, using one or more receive beams associated with a second TCI state, a second downlink transmission for a first TRP and a second TRP;
   identifying that the second TCI state lacks an associated PCI; and
   decoding the received second downlink transmission using a default PCI.

9. The method of claim 1, further comprising:
   monitoring for the downlink transmission in a common search space.

10. The method of claim 9, wherein the downlink transmission comprises a downlink control channel signal in the common search space.

11. A method for wireless communication at a base station, comprising:
    identifying an association between a plurality of physical cell identifiers (PCIs) and a plurality of transmission configuration indicator (TCI) states for a user equipment (UE), the plurality of PCIs identifying a plurality of transmission reception points (TRPs);

transmitting, to the UE, an indication of the identified association; and transmitting, to the UE based at least in part on transmitting the indication of the identified association, a downlink transmission encoded according to a first PCI or a second PCI based at least in part on the identified association.

12. The method of claim 11, further comprising:
identifying the first PCI of the plurality of PCIs associated with a synchronization signal block (SSB) for the UE during initial access for the UE, wherein the downlink transmission is encoded using the first PCI based at least in part on the identification.

13. The method of claim 11, further comprising:
identifying that one of a first TRP of the plurality of TRPs or a second TRP of the plurality of TRPs has radio link management (RLM) resources configured for the UE, wherein the downlink transmission is encoded using the first PCI identifying the first TRP or the second PCI identifying the second TRP according to the one of the first TRP or the second TRP having the RLM resources configured.

14. The method of claim 11, further comprising:
identifying a configuration of the UE to receive broadcast transmissions from one of a first TRP of the plurality of TRPs or a second TRP of the plurality of TRPs, wherein the downlink transmission is encoded using the first PCI identifying the first TRP or the first PCI identifying the second TRP according to the identified configuration.

15. The method of claim 11, further comprising:
determining that the first PCI or the second PCI has a smaller value than an other of the first PCI or the second PCI, wherein the downlink transmission is encoded using the first PCI or the second PCI having the smaller value.

16. An apparatus for wireless communication as a user equipment (UE), comprising:
a processor, memory coupled with the processor; and instructions stored in the memory and operable, when executed by the processor, to cause the apparatus to:
receive, using one or more receive beams associated with a transmission configuration indicator (TCI) state, a downlink transmission from a plurality of transmission reception points (TRPs) identified by a plurality of physical cell identifiers (PCIs);
identify, based at least in part on the TCI state and an association between the plurality of PCIs and a plurality of TCI states, a first PCI of the plurality of PCIs to use to process the received downlink transmission; and
process the received downlink transmission using the identified first PCI.

17. The apparatus of claim 16, wherein the instructions are further executable by the processor to cause the apparatus to:
receive an indication of the association between the plurality of PCIs and the TCI state.

18. The apparatus of claim 16, wherein the TCI state is associated with at least the first PCI and a second PCI of the plurality of PCIs.

19. The apparatus of claim 18, wherein the instructions are further executable by the processor to cause the apparatus to:

receive a synchronization signal block (SSB) during an initial access procedure of the UE; and determine a PCI based at least in part on the received SSB, wherein the first PCI of the plurality of PCIs to use to decode the received downlink transmission comprises the determined PCI.

20. The apparatus of claim 18, wherein the instructions are further executable by the processor to cause the apparatus to:
identify that one of a first TRP or a second TRP has radio link management (RLM) resources configured for the UE, wherein the received downlink transmission is decoded using the first PCI identifying the first TRP or the first PCI identifying the second TRP according to the one of the first TRP or the second TRP having the RLM resources configured.

21. The apparatus of claim 18, wherein the instructions are further executable by the processor to cause the apparatus to:
identify a configuration of the UE to receive broadcast transmissions from one of a first TRP or a second TRP, wherein the received downlink transmission is decoded using the first PCI identifying the first TRP or the first PCI identifying the second TRP according to the identified configuration.

22. The apparatus of claim 18, wherein the instructions are further executable by the processor to cause the apparatus to:
determine that the first PCI has a smaller value than the second PCI, wherein the first PCI is identified based at least in part on the determination.

23. The apparatus of claim 16, wherein the instructions are further executable by the processor to cause the apparatus to:
receive, using one or more receive beams associated with a second TCI state, a second downlink transmission for a first TRP and a second TRP;
identify that the second TCI state lacks an associated PCI; and
decode the received second downlink transmission using a default PCI.

24. The apparatus of claim 16, wherein the instructions are further executable by the processor to cause the apparatus to:
monitor for the downlink transmission in a common search space.

25. The apparatus of claim 24, wherein the downlink transmission comprises a downlink control channel signal in the common search space.

26. An apparatus for wireless communication at a base station, comprising:
a processor, memory coupled with the processor; and instructions stored in the memory and operable, when executed by the processor, to cause the apparatus to:
identify an association between a plurality of physical cell identifiers (PCIs) and a plurality of transmission configuration indicator (TCI) states for a user equipment (UE), the plurality of PCIs identifying a plurality of transmission reception points (TRPs);
transmit, to the UE, an indication of the identified association; and
transmit, to the UE based at least in part on transmitting the indication of the identified association, a downlink transmission encoded according to a first PCI or a second PCI based at least in part on the identified association.

27. The apparatus of claim 26, wherein the instructions are further executable by the processor to cause the apparatus to:
    identify the first PCI of the plurality of PCIs associated with a synchronization signal block (SSB) for the UE during initial access for the UE, wherein the downlink transmission is encoded using the first PCI based at least in part on the identification.

28. The apparatus of claim 26, wherein the instructions are further executable by the processor to cause the apparatus to:
    identify that one of a first TRP of the plurality of TRPs or a second TRP of the plurality of TRPs has radio link management (RLM) resources configured for the UE, wherein the downlink transmission is encoded using the first PCI identifying the first TRP or the second PCI identifying the second TRP according to the one of the first TRP or the second TRP having the RLM resources configured.

29. The apparatus of claim 26, wherein the instructions are further executable by the processor to cause the apparatus to:
    identify a configuration of the UE to receive broadcast transmissions from one of a first TRP of the plurality of TRPs or a second TRP of the plurality of TRPs, wherein the downlink transmission is encoded using the first PCI identifying the first TRP or the first PCI identifying the second TRP according to the identified configuration.

30. The apparatus of claim 26, wherein the instructions are further executable by the processor to cause the apparatus to:
    determine that the first PCI or the second PCI has a smaller value than an other of the first PCI or the second PCI, wherein the downlink transmission is encoded using the first PCI or the second PCI having the smaller value.

* * * * *